US012586422B2

(12) United States Patent
Merg et al.

(10) Patent No.: US 12,586,422 B2
(45) Date of Patent: Mar. 24, 2026

(54) SYSTEMS AND METHODS OF CONFIGURING VEHICLE SERVICE TOOLS ASSOCIATED WITH DISPLAY DEVICE BASED ON OPERATING CONDITION OF VEHICLE

(71) Applicant: Snap-on Incorporated, Kenosha, WI (US)

(72) Inventors: Patrick S. Merg, Hollister, CA (US); Jacob G. Foreman, Hollister, CA (US); Roy S. Brozovich, Campbell, CA (US); Joshua C. Covington, San Juan Bautista, CA (US); Kahlil H. Cacabelos, San Jose, CA (US)

(73) Assignee: Snap-on Incorporated, Kenosha, WI (US)

( * ) Notice: Subject to any disclaimer, the term of this patent is extended or adjusted under 35 U.S.C. 154(b) by 0 days.

(21) Appl. No.: 18/457,845

(22) Filed: Aug. 29, 2023

(65) Prior Publication Data

US 2023/0398963 A1    Dec. 14, 2023

Related U.S. Application Data

(63) Continuation of application No. 16/538,052, filed on Aug. 12, 2019, now Pat. No. 11,787,371, which is a
(Continued)

(51) Int. Cl.
*G07C 5/00* (2006.01)
*B60S 5/00* (2006.01)
(Continued)

(52) U.S. Cl.
CPC ............... *G07C 5/008* (2013.01); *B60S 5/00* (2013.01); *G06Q 10/06* (2013.01); *G07C 5/0808* (2013.01);
(Continued)

(58) Field of Classification Search
CPC .... G07C 5/008; G07C 5/0808; G07C 5/0825; G07C 2205/02; B60S 5/00; G06Q 10/06; H04L 67/12; H04L 67/01
See application file for complete search history.

(56) References Cited

U.S. PATENT DOCUMENTS

| 5,227,614 A | * | 7/1993 | Danielson | .......... G06K 7/10584 382/315 |
| 6,141,608 A | | 10/2000 | Rother | |
(Continued)

FOREIGN PATENT DOCUMENTS

EP        2990269 A1    3/2016

OTHER PUBLICATIONS

European Patent Office; Summons to attend oral proceedings pursuant to Rule 115(1) EPC for Application No. 18 702 598.6-1203; dated May 31, 2022.
(Continued)

*Primary Examiner* — Redhwan K Mawari
(74) *Attorney, Agent, or Firm* — McDonnell Boehnen Hulbert & Berghoff LLP

(57) ABSTRACT

Systems and methods for augmenting measurements with automotive repair information are described herein. A method may include a server storing a plurality of service scenarios defined for at least one display device. Each stored service scenario includes at least one setup instruction, and each setup instruction is based on at least one capability of at least one CVST. The method may further include the server receiving data indicating an operating condition of a vehicle from a first display device of the at least one display device. Based on the stored plurality of service scenarios and the received data, the server may determine that a first stored service scenario of the plurality of service scenarios matches the operating condition. The server may then determine a first CVST having a first capability that is associated with
(Continued)

the first display device, and transmitting the first stored service scenario to the first display device.

26 Claims, 8 Drawing Sheets

Related U.S. Application Data continuation of application No. 15/408,910, filed on Jan. 18, 2017, now Pat. No. 10,421,440.

(51) Int. Cl.

| | |
|---|---|
| *G06Q 10/06* | (2023.01) |
| *G07C 5/08* | (2006.01) |
| *H04L 67/12* | (2022.01) |
| *H04L 67/02* | (2022.01) |
| *H04L 67/06* | (2022.01) |

(52) U.S. Cl.
CPC ............ *G07C 5/0825* (2013.01); *H04L 67/12* (2013.01); *G07C 2205/02* (2013.01); *H04L 67/02* (2013.01); *H04L 67/06* (2013.01)

(56) References Cited

U.S. PATENT DOCUMENTS

| | | | | |
|---|---|---|---|---|
| 6,738,697 | B2* | 5/2004 | Breed | .................. B60C 11/246 701/32.4 |
| 7,751,955 | B2 | 7/2010 | Chinnadurai et al. | |
| 7,925,464 | B1* | 4/2011 | Bazemore | ................. G01S 7/40 702/121 |
| 8,319,735 | B2 | 11/2012 | Fudali et al. | |
| 8,413,341 | B2 | 4/2013 | Chen et al. | |
| 8,630,765 | B2 | 1/2014 | Chen | |
| 8,977,423 | B2* | 3/2015 | Merg | .................... G07C 5/006 701/32.7 |
| 9,575,743 | B1* | 2/2017 | Chun | ...................... G06F 8/654 |
| 9,715,665 | B2* | 7/2017 | Schondorf | .............. H04L 67/12 |
| 10,248,489 | B2* | 4/2019 | Nomura | ............. G06F 11/0739 |
| 10,421,440 | B2 | 9/2019 | Merg et al. | |
| 2002/0138185 | A1* | 9/2002 | Trsar | ...................... G07C 5/085 340/438 |
| 2005/0102580 | A1* | 5/2005 | House | ................. G06F 11/2294 714/38.14 |
| 2006/0136104 | A1 | 6/2006 | Brozovich et al. | |
| 2008/0071439 | A1 | 3/2008 | Bertosa et al. | |
| 2008/0140300 | A1* | 6/2008 | Kuo | .................... F02D 13/0265 701/113 |
| 2009/0259358 | A1 | 10/2009 | Andreasen | |
| 2009/0276115 | A1* | 11/2009 | Chen | .................... G07C 5/0808 701/29.6 |
| 2011/0055646 | A1* | 3/2011 | Mukherjee | ....... G11C 29/56008 714/E11.169 |
| 2011/0071720 | A1* | 3/2011 | Schondorf | ............. G06Q 10/06 701/29.5 |
| 2011/0246018 | A1* | 10/2011 | Bertosa | .............. G05B 19/0428 701/29.6 |
| 2012/0044052 | A1 | 2/2012 | Davis et al. | |
| 2012/0044086 | A1 | 2/2012 | Ruther et al. | |
| 2012/0046826 | A1 | 2/2012 | Panko | |
| 2012/0046897 | A1 | 2/2012 | Panko | |
| 2012/0047291 | A1 | 2/2012 | Davis et al. | |
| 2012/0047499 | A1 | 2/2012 | Krystofczyk et al. | |
| 2012/0324075 | A1* | 12/2012 | Bertosa | ................... H04L 67/12 709/223 |
| 2013/0173136 | A1* | 7/2013 | Kim | ..................... G07C 5/0825 340/439 |
| 2013/0185093 | A1* | 7/2013 | Wittliff, III | ........... G16H 50/20 705/2 |
| 2013/0317694 | A1* | 11/2013 | Merg | ..................... G07C 5/008 701/31.6 |
| 2014/0074343 | A1* | 3/2014 | Fish | ..................... G07C 5/0808 701/29.6 |
| 2014/0075356 | A1 | 3/2014 | Gray et al. | |
| 2014/0350777 | A1* | 11/2014 | Kawai | .................. G07C 5/0808 701/32.3 |
| 2014/0365064 | A1* | 12/2014 | Pham | ..................... G07C 5/008 701/29.6 |
| 2015/0170437 | A1* | 6/2015 | Hosein | ................... G07C 5/006 701/29.6 |
| 2017/0098200 | A1* | 4/2017 | Merg | .................. G06F 3/04817 |
| 2017/0316351 | A1* | 11/2017 | Schondorf | ............. G07C 5/008 |
| 2018/0201236 | A1 | 7/2018 | Merg et al. | |
| 2019/0359182 | A1 | 11/2019 | Merg et al. | |
| 2020/0079223 | A1* | 3/2020 | Puri | ........................ B60L 58/13 |
| 2020/0148217 | A1* | 5/2020 | Woo | ............... B60W 30/18027 |
| 2021/0092019 | A1* | 3/2021 | Fang | ...................... H04L 41/28 |

OTHER PUBLICATIONS

European Patent Office; Communication purusant to Article 94(3) for European Patent Application No. 18 702 598.6-1203; dated Dec. 14, 2020.

International Search Report, International Application No. PCT. US2018/013576, mailed Mar. 7, 2018, 5 pages.

Written Opinion of the International Searching Authority, International Application No. PCT/US2018/013576, mailed Mar. 7, 2018, 7 pages.

Seyfert, Karl, OBD II Generic PID Diagnosis, Motor Magazine, Sep. 2007, Troy, Michigan (4 pages).

Verdict® User Manual, EAZ0063L05G Rev. A, Snap-on Incorporated, 2015 (207 pages); (electronic copy provided with IDS split up into four separate PDF files including 50, 50, 50 and 57 pages).

\* cited by examiner

Figure 5:
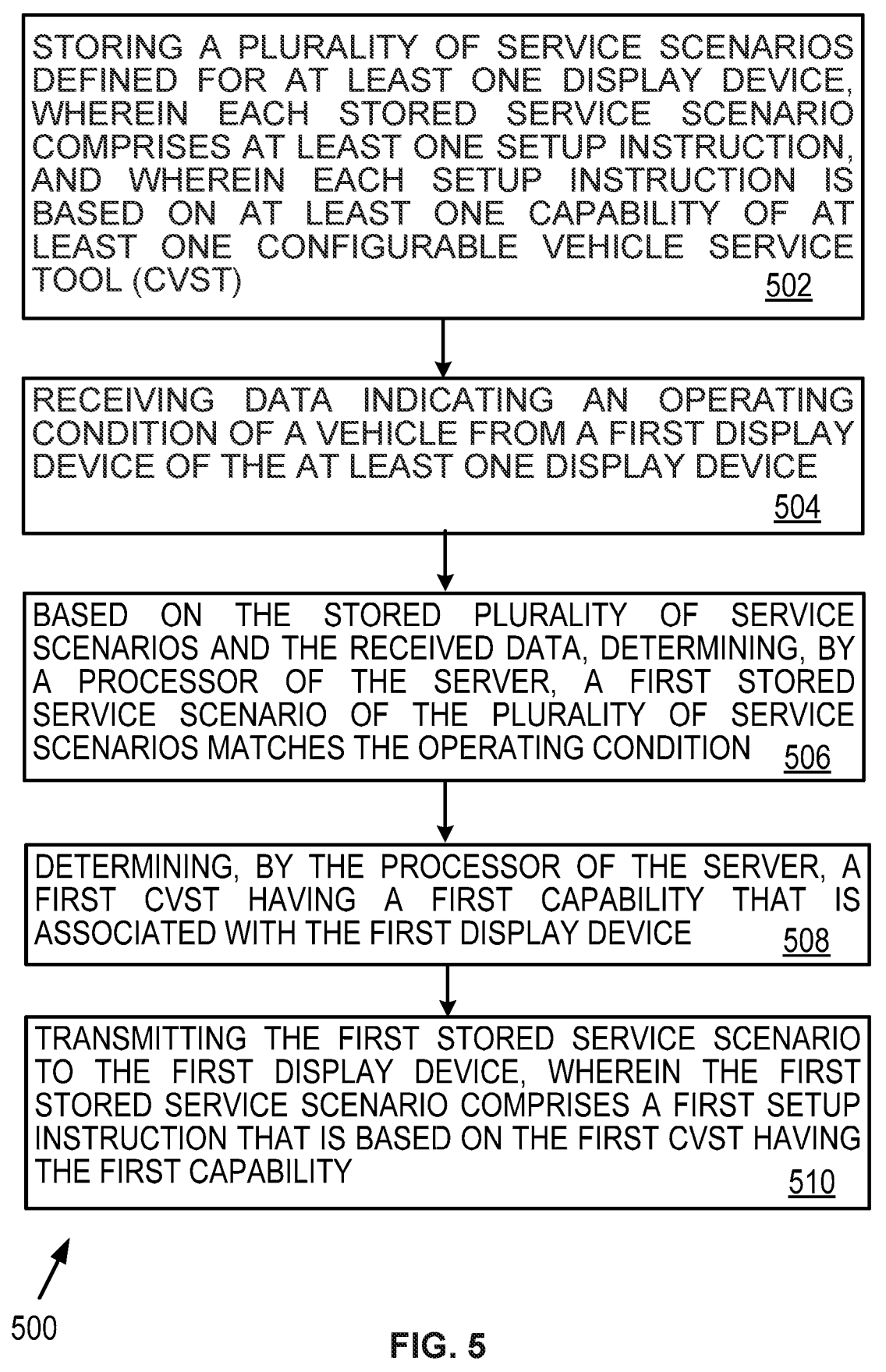

STORING A PLURALITY OF SERVICE SCENARIOS DEFINED FOR AT LEAST ONE DISPLAY DEVICE, WHEREIN EACH STORED SERVICE SCENARIO COMPRISES AT LEAST ONE SETUP INSTRUCTION, AND WHEREIN EACH SETUP INSTRUCTION IS BASED ON AT LEAST ONE CAPABILITY OF AT LEAST ONE CONFIGURABLE VEHICLE SERVICE TOOL (CVST)     502

RECEIVING DATA INDICATING AN OPERATING CONDITION OF A VEHICLE FROM A FIRST DISPLAY DEVICE OF THE AT LEAST ONE DISPLAY DEVICE     504

BASED ON THE STORED PLURALITY OF SERVICE SCENARIOS AND THE RECEIVED DATA, DETERMINING, BY A PROCESSOR OF THE SERVER, A FIRST STORED SERVICE SCENARIO OF THE PLURALITY OF SERVICE SCENARIOS MATCHES THE OPERATING CONDITION     506

DETERMINING, BY THE PROCESSOR OF THE SERVER, A FIRST CVST HAVING A FIRST CAPABILITY THAT IS ASSOCIATED WITH THE FIRST DISPLAY DEVICE     508

TRANSMITTING THE FIRST STORED SERVICE SCENARIO TO THE FIRST DISPLAY DEVICE, WHEREIN THE FIRST STORED SERVICE SCENARIO COMPRISES A FIRST SETUP INSTRUCTION THAT IS BASED ON THE FIRST CVST HAVING THE FIRST CAPABILITY     510

TRANSMITTING DATA INDICATING AN OPERATING CONDITION OF A VEHICLE                                                                702

↓

RECEIVING A FIRST STORED SERVICE SCENARIO, WHEREIN THE FIRST STORED SERVICE SCENARIO COMPRISES A FIRST SETUP INSTRUCTION THAT IS BASED ON A FIRST CONFIGURABLE VEHICLE SERVICE TOOL (CVST) HAVING A FIRST CAPABILITY AND THE OPERATING CONDITION OF THE VEHICLE                                                                704

↓

IN RESPONSE TO RECEIVING THE FIRST STORED SERVICE SCENARIO, CONFIGURING THE FIRST CVST WITH THE FIRST SETUP INSTRUCTION TO USE THE FIRST CAPABILITY ASSOCIATED WITH THE FIRST SERVICE SCENARIO                                                                706

SYSTEMS AND METHODS OF CONFIGURING VEHICLE SERVICE TOOLS ASSOCIATED WITH DISPLAY DEVICE BASED ON OPERATING CONDITION OF VEHICLE

REFERENCE TO RELATED APPLICATION

This application is a continuation application of U.S. patent application Ser. No. 16/538,052 filed Aug. 12, 2019. U.S. patent application Ser. No. 16/538,052 published on Nov. 28, 2019 as United States Patent Application Publication No. 2019/0359182 and is a continuation application of U.S. patent application Ser. No. 15/408,910, filed on Jan. 18, 2017. U.S. patent application Ser. No. 15/408,910 published as United States Patent Application Publication No. 2018/0201236 A1 on Jul. 19, 2018 and issued on Sep. 24, 2019 as U.S. Pat. No. 10,421,440. U.S. patent application Ser. No. 15/408,910 and United States Patent Application Publication No. 2018/0201236 A1 are incorporated herein by reference.

BACKGROUND

Most vehicles are serviced at least once during their useful life. In many instances, a vehicle is serviced at a facility with professional mechanics (e.g., technicians). The technicians may use any of a variety of hand tools to service (e.g., repair) any of the wide variety of mechanical components on a vehicle. The technician may need different data during various stages of servicing the vehicle in conjunction with or without the various tools and equipment. The technician may need to spend valuable time searching for the various data needed to service the vehicle and even more valuable time evaluating the data to determine a repair to perform to the vehicle, which service tool should be used to perform a service task and/or repair, and how to set up and use the service tool.

SUMMARY

Example embodiments are described herein. In one aspect, an example embodiment may take the form of a method performed by a server. The method may include: (i) storing a plurality of service scenarios defined for at least one display device, wherein each stored service scenario includes at least one setup instruction, and wherein each setup instruction is based on at least one capability of at least one configurable vehicle service tool (CVST); (ii) receiving data indicating an operating condition of a vehicle from a first display device of the at least one display device; (iii) based on the stored plurality of service scenarios and the received data, determining, by a processor of the server, a first stored service scenario of the plurality of service scenarios matches the operating condition; (iv) determining, by the processor of the server, a first CVST having a first capability that is associated with the first display device; and (v) transmitting the first stored service scenario to the first display device, wherein the first stored service scenario comprises a first setup instruction that is based on the first CVST having the first capability.

In another aspect, an example embodiment may take the form of a method performed by a display device. The method may include: (i) transmitting data indicating an operating condition of a vehicle; (ii) receiving a first stored service scenario, wherein the first stored service scenario comprises a first setup instruction that is based on a first configurable vehicle service tool (CVST) having a first capability; and (iii) in response to receiving the first stored service scenario, configuring the first CVST with the first setup instruction to use the first capability associated with the first service scenario.

In a further aspect, an example embodiment may take the form of a system. The system may include at least one display device comprising a first display device, at least one configurable vehicle service tool (CVST), and a server coupled to the at least one display device by a communication network. The server may include one or more processors, and tangible, non-transitory computer-readable media having instructions encoded thereon, wherein the instructions, when executed by the one or more processors, cause the server to perform a method that includes: (i) storing a plurality of service scenarios defined for the at least one display device, wherein each stored service scenario includes at least one setup instruction, and wherein each setup instruction is based on at least one capability of the at least one CVST (ii) receiving data indicating an operating condition of a vehicle from the first display device; (iii) based on the stored plurality of service scenarios and the received data, determining that a first stored service scenario of the plurality of service scenarios matches the operating condition; (iv) determining a first CVST having a first capability that is associated with the first display device; and (v) transmitting the first stored service scenario to the first display device, wherein the first stored service scenario comprises a first setup instruction that is based on the first CVST having the first capability.

In yet a further aspect, an example embodiment may take the form of tangible, non-transitory computer-readable media having instructions encoded thereon, wherein the instructions, when executed by one or more processors, cause a server to perform a method that includes: (i) storing a plurality of service scenarios defined for at least one display device, wherein each stored service scenario includes at least one setup instruction, and wherein each setup instruction is based on at least one capability of at least one configurable vehicle service tool (CVST); (ii) receiving data indicating an operating condition of a vehicle from a first display device of the at least one display device; (iii) based on the stored plurality of service scenarios and the received data, determining a first stored service scenario of the plurality of service scenarios matches the operating condition; (iv) determining a first CVST that is associated with the first display device, wherein the first CVST has a first capability to perform the first setup instruction of the first stored service scenario; and (v) transmitting the first stored service scenario to the first display device, wherein the first stored service scenario comprises a first setup instruction that is based on the first CVST having the first capability.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments are described herein with reference to the drawings.

FIG. 5 shows a flow chart of an example method.

FIG. 7 shows another flow chart of an example method.

DETAILED DESCRIPTION

I. Introduction

Figure 1:
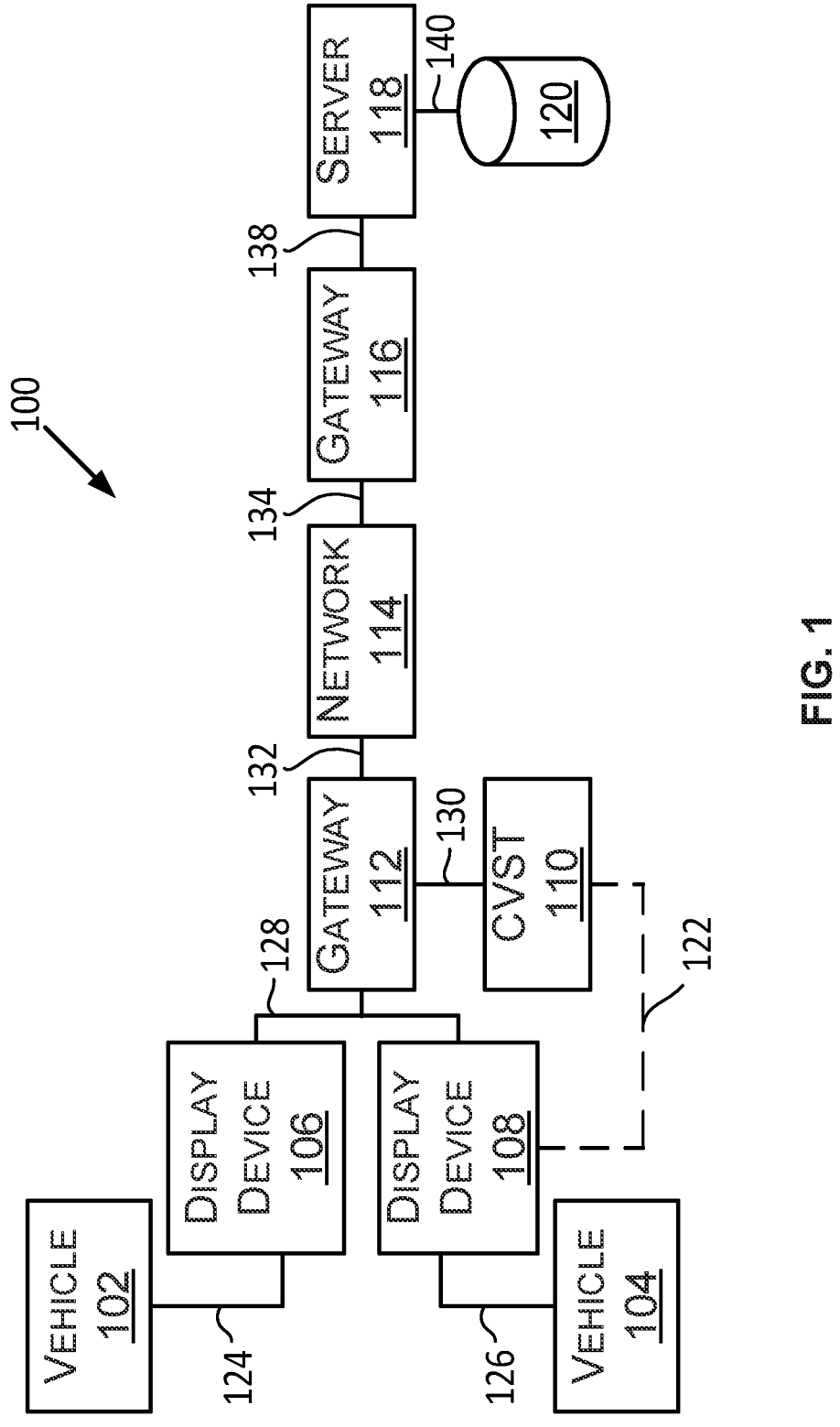
FIG. 1 shows a block diagram of a system in accordance with example embodiments.

Vehicle service technician may use a variety of tools to diagnose, repair, or service a particular vehicle. In some instances, however, it may be difficult and time consuming to diagnose or repair a particular vehicle that may have unfamiliar or unique vehicle components and/or systems. Additionally, a vehicle service technician may be unfamiliar with the tool needed to diagnose, repair, or service a particular vehicle. In some cases, the vehicle service technician may not have a specific tool and may not know of any alternative tools that could be used to diagnose, repair, or service a particular vehicle. Further, the technician may have outdated instructions in diagnosing, or servicing a particular vehicle. In such cases, it may become time consuming for a vehicle service technician to service a particular vehicle, and time consuming for a customer who may be waiting for the technician to resolve a particular vehicle condition. Accordingly, in many applications, it may be beneficial to provide the technician with quick, accurate, and specific instructions on what tool the technician may use to service a particular vehicle, how to configure the tool, and proven tests the technician may perform to diagnose, repair, or service a vehicle.

This description describes several example embodiments. At least some of the example embodiments may provide one or more of the benefits described above. Moreover, at least some of the example embodiments may relate to systems and methods in which a configurable vehicle service tool (CVST) is arranged to repair, service, or maintain a vehicle. The system may include a display device, a CVST, a server, and various communication links to facilitate communications between the devices in the system. In some examples, the system may include multiple display devices and/or multiple CVSTs.

A CVST may be capable of diagnosing, repairing, and/or measuring a variety of parameters or components within a vehicle. In some examples, a CVST may comprise a computing device, such as a mobile computing device (e.g., mobile phone, tablet), or any one of the display devices described herein, among other display devices. In other examples, a CVST may comprise an oscilloscope, sound level meter, or digital-volt-ohm meter, among other devices that may be electronically configurable to diagnose, repair, service, or maintain a vehicle. In further examples, a CVST may comprise a diagnostic scan tool arranged to communicate with electronic control units in a vehicle over a vehicle data bus.

In some embodiments, the server may be configured to store a plurality of service scenarios that may be provided to the display device. In other embodiments, the display device may store a plurality of service scenarios. Each service scenario may define an operating condition of a vehicle, and the display device may obtain data indicative of the operating condition. In some instances, the display device may send data indicative of the operating condition to the server. The server may then determine the operating condition and provide a service scenario to the display device that matches the operating condition. In other instances, the display device may be able to determine the operating condition and receive a service scenario from the server that matches the operating condition. In some embodiments, the server may send a plurality of service scenarios that may match the operating condition, and the display device may select the appropriate service scenario.

Additionally, each service scenario may include vehicle manufacturer information, a vehicle symptom associated with the vehicle manufacturer information, and at least one location of a service flow chart associated with the manufacturer information. The service flow chart may provide instructions on how to configure a CVST to troubleshoot or repair a vehicle. In particular, the service flow chart of each service scenario may include instructions on how to configure a particular CVST based on the capabilities of the CVST. For example, a CVST may comprise an oscilloscope. The server may store service scenarios that include setup instructions on how to configure the oscilloscope and take measurements using the oscilloscope to troubleshoot or repair a vehicle for a particular symptom. In another example, a CVST may comprise a voltmeter, or a scan tool, among other electronic measurement and/or vehicle diagnostic tools. The server may store service scenarios that include setup instructions on how to configure such electronic units to take specific electronic measurements (e.g., voltage, current, resistance, duty cycle, pressure, temperature, etc.). In further examples, a CVST may comprise a mobile phone. The server may store service scenarios that include setup instructions on how to configure the mobile phone for taking specific sound measurements, and setup instructions on using the mobile phone's camera to take specific pictures of a vehicle component or system, among other setup instructions based on the capabilities of a mobile phone. Such measurements may be useful in diagnosing a vehicle condition.

In some embodiments, the setup instructions may take more of a digital form (e.g., configuration instructions), which may configure various CVSTs described herein with little or no additional user input. For instance, the server may provide digital instructions that configure an oscilloscope with little or no additional user input, thereby allowing a user to take measurements with the oscilloscope without modifying the configuration settings of the oscilloscope. Such instructions significantly reduce the time it takes for a user to configure a CVST and provides greater accuracy by eliminating operator error. The benefits of these configurable instructions are especially noticeable for users who may have little or no experience with a particular CVST or unfamiliar with a particular vehicle symptom or configuration setting for a particular CVST.

In some embodiments, a service scenario may provide additional information that includes data indicative of a particular vehicle symptom or condition that was resolved previously for a particular vehicle model. The additional information may be data of what CVST a vehicle service technician may have used, how the CVST was used, and how successful that test was in diagnosing, repairing, or servicing a vehicle condition. This additional information provides the benefit of providing confirmation of successful vehicle repairs using a given service scenario and bolsters the credibility of a service scenario with real life examples and known-good test results for specific vehicle types. Additionally, the additional information allows a vehicle service technician to create new service scenarios using the test results from diagnosing, repairing, or servicing a vehicle condition. This has the benefit of creating a library or database of proven, successful service scenarios which would reduce significant work time for a vehicle service technician to diagnose, repair, or service a particular vehicle.

In some embodiments, the server may determine an order of precedence in providing multiple setup instructions. For example, a vehicle may have an issue with its sound system. The server may determine that an oscilloscope should be used to take current and/or voltage measurements of the vehicle's sound system or component, or wiring of the sound system before providing instructions to take other specific sound measurements. Other examples are described herein.

In some embodiments, the server may receive data indicating an operating condition of a vehicle from the display device. The operating condition may relate to the status of a vehicle system or component. The operating condition can include vehicle manufacturer information. For example, the operating condition may be a condition of a vehicle's brakes, transmission, engine, entertainment system, steering, or suspension, among other systems. In particular, the data indicating the operating condition of the engine may include data indicating the revolutions per minute (RPM) the engine crankshaft is turning, the temperature of the engine's coolant, and/or the state of an air conditioning compressor (on or off). In other examples, the operating condition may be a condition of a vehicle's brake caliper, brake shoe, or brake pad, among other vehicle components.

Based on the stored service scenarios and the received data indicating an operating condition, some examples may include the server determining that a particular service scenario matches the operating condition of a vehicle. For example, the server may receive information indicating that a vehicle's sound system needs repair and a voltmeter is available as a CVST to repair or service the sound system. The server may include several stored service scenarios on how to use a voltmeter to repair or take measurements to troubleshoot a vehicle. Based on the stored service scenarios and the received data indicating the operating condition of the vehicle, the server may determine a particular service scenario that matches the particular vehicle type (e.g., make, year, model) and the particular symptom of the vehicle (e.g., no audio from rear speakers of the vehicle's sound system). The particular service scenario may then include instructions on how to configure the voltmeter to repair or troubleshoot the particular vehicle's sound system. In some embodiments, the server may provide electronically configurable instructions to the CVST (e.g., directly to the CVST or via a display device communicatively coupled to the CVST and server) to configure the voltmeter with little or no user input, thereby allowing the user to take measurements without modifying the configuration settings of the voltmeter.

In another example, the server may receive information indicating that a vehicle's sound system needs repair and certain measurements must be taken to troubleshoot the issue. The server may include a stored service scenario for repairing or servicing the particular vehicle's sound system. Based on this stored service scenario, which includes setup instructions to repair and/or take measurements related to the vehicle's sound system, the server may determine a CVST that is available and has the capability to perform the instructions. The server may then send the service scenario to a display device associated with the CVST or communicatively coupled to the CVST so that the CVST can execute the service scenario using its capabilities.

In some embodiments, the server may determine a CVST that is available and has the capability to perform particular instructions of a service scenario by transmitting a message to a display device. The message, for example, may include a request for information to determine if the display device is associated with a CVST that is available and has the capability to perform the particular instructions. In a more specific example, the server may send a message to the display device to determine if there is a CVST, such as an oscilloscope, available to take measurements related to a vehicle's sound system. In response to the message, the display device may send a reply message to the server indicating whether there is a CVST available that can perform the particular instructions. For example, the display device may send a message to the server indicating that a voltmeter is available and has the capability to take measurements (e.g., voltage readings) related to a vehicle's sound system. In another example, the display device may send a message to the server indicating that a mobile phone is available and has the capability to take sound measurements from the vehicle's sound system. Many other examples are possible.

In other embodiments, the server may determine a CVST that is available and has the capability to perform instructions of a service scenario based on a model identifier associated with a particular display device, and a capability identifier associated with the model identifier. For example, multiple display devices may be communicatively coupled to the server. The server may identify each display device based on a model identifier or serial number of the display device. Each model identifier may be linked or associated with at least one capability identifier. For example, the server may store a lookup table that correlates each model identifier to at least one capability identifier. In some embodiments, the capability identifiers may include data representing capabilities of a particular CVST associated with a display device. In other embodiments, the capability identifiers may include data representing capabilities of multiple CVSTs associated with a display device. In a particular example, the server may be communicatively coupled to two display devices. The first display device may have a first model identifier associated with capability identifiers. For example, the capability identifiers of the first display device may represent capabilities of a mobile phone (e.g., taking a picture, recording sound). In another example the capability identifiers of the first display device may represent capabilities of a mobile phone and an oscilloscope, among other CVSTs.

In some embodiments, multiple CVSTs associated with a particular display device may have the capability to perform instructions of a service scenario. For example, a display device may be associated with a voltmeter and an oscilloscope. Both CVSTs may be capable of, for example, taking voltage readings related to a vehicle's sound system. In some examples, the server may send instructions on how to take voltage readings using either one of the CVSTs. In another example, the server may choose a CVST based on one or more factors. For example, the server may determine that a particular voltmeter associated with a display device is easier to configure or use compared to a particular oscilloscope associated with the display device. Additionally or alternatively, the server may determine that a particular oscilloscope provides more accurate measurements than a particular voltmeter associated with the display device. Other examples are possible.

In this description, the articles "a," "an" or "the" are used to introduce elements of the example embodiments. The intent of using those articles is that there is one or more of the elements. In this description, the intent of using the term "and/or" within a list of at least two elements or functions and the intent of using the terms "at least one of" and "one or more of" immediately preceding a list of at least two components or functions is to cover each embodiment including a listed component or function independently and each embodiment comprising a combination of the listed components or functions. For example, an embodiment described as comprising "A, B, and/or C," or "at least one of A, B, and C," or "one or more of A, B, and C" is intended to cover each of the following possible embodiments: (i) an embodiment comprising A, but not B and not C, (ii) an embodiment comprising B, but not A and not C, (iii) an embodiment comprising C, but not A and not B, (iv) an embodiment comprising A and B, but not C, (v) an embodiment comprising A and C, but not B, (v) an embodiment comprising B and C, but not A, and (vi) an embodiment comprising A, B, and C. For the embodiments comprising component or function A, the embodiments can comprise one A or multiple A. For the embodiments comprising component or function B, the embodiments can comprise one B or multiple B. For the embodiments comprising component or function C, the embodiments can comprise one C or multiple C. The use of ordinal numbers such as "first," "second," "third" and so on is to distinguish respective elements rather than to denote a particular order of those elements unless the context of using those terms explicitly indicates otherwise.

The term "data" within this description may be used interchangeably with the term "information" or similar terms, such as "content." The data described herein may be transmitted and received. As an example, any transmission of the data described herein may occur directly from a transmitting device (e.g., a transmitter) to a receiving device (e.g., a receiver). As another example, any transmission of the data described herein may occur indirectly from the transmitter to the receiver via one of one or more intermediary network devices, such as an access point, an antenna, a base station, a hub, a modem, a relay, a router, a switch, or some other network device.

The data may represent various things such as objects and conditions. The objects and conditions may be mapped to a data structure (e.g., a table). A processor may refer to the data structure to determine what object or condition is represented by the data. As an example, the data received by a processor may represent a calendar date. The processor can determine the calendar date by comparing the data to a data structure that defines calendar dates. As another example, data received by a processor may represent a vehicle component. The processor can determine what type of vehicle component is represented by the data by comparing the data to a structure that defines a variety of vehicle components.

The diagrams, flow charts, and other data shown in the figures are provided merely as examples and are not intended to be limiting. Many of the elements illustrated in the figures or described herein are functional elements that may be implemented as discrete or distributed components or in conjunction with other components, and in any suitable combination and location. Those skilled in the art will appreciate that other arrangements and elements (e.g., machines, interfaces, functions, orders, or groupings of functions) may be used instead. Furthermore, various functions described as being performed by one or more elements may be carried out by a processor executing computer-readable program instructions (CRPI) or by a combination of hardware, firmware, or software. Furthermore still, identical reference numbers used in the same or different figures denote elements that are identical to other elements referred to by the same reference number, but those denoted elements and the other elements are not so limited.

II. Example Systems

FIG. 1 is a block diagram 100 showing component(s) of a system in accordance with example embodiments described herein. The components shown in FIG. 1 include a vehicle 102, a vehicle 104, a display device 106, a display device 108, a configurable vehicle service tool (CVST) 110, a gateway 112, a network 114, a gateway 116, a server 118, a database 120, a display-device-to-CVST communication link 122, a vehicle-to-display-device communication link 124, a vehicle-to-display-device communication link 126, a display-device-to-gateway communication link 128, a server-to-gateway communication link 138, a server-to-database communication link 140, network communication links 132, 134, and a CVST-to-gateway communication link 130.

A system including a component shown in FIG. 1 may include all of the components shown in FIG. 1 or any proper subset of components shown in FIG. 1. Any one of those systems may include other components not shown in FIG. 1 as well. As an example, a first example system may include one of the display devices 106, 108, CVST 110, the gateways 112, 116, the network 114, the server 118, and the database 120, and the communication links shown connecting the system components. Multiple display devices are shown in FIG. 1 to illustrate examples of how a display device may be used or connected within an example system.

A person skilled in the art will understand that an example embodiment including a display device may include only one display device rather than multiple display devices. Accordingly, in some embodiments, such as an embodiment including the display device 108, the system may be operational without a vehicle being connected to a display device. At another time though, the display device 108 may connect to a vehicle and be operational within the example system. In some example embodiments, the system may include multiple CVSTs connected to a display device. Additionally or alternatively, multiple CVSTs may be connected to multiple display devices. In some example embodiments, a CVST may not be connected to a display device. Instead, a display device or server may store information associated with a CVST. Other examples are possible.

A vehicle, such as the vehicle 102 or the vehicle 104, is a mobile machine that may be used to transport a person, people, or cargo. As an example, any vehicle described herein may be driven or otherwise guided along a path (e.g., a paved road or otherwise) on land, in water, or in the air or outer space. As another example, any vehicle described herein may be wheeled, tracked, railed or skied. As yet another example, any vehicle described herein may include an automobile, a motorcycle, an all-terrain vehicle (ATV) defined by ANSI/SVIA-1-2007, a snowmobile, a personal watercraft (e.g., a JET SKI® personal watercraft), a light-duty truck, a medium-duty truck, a heavy-duty truck, a semi-tractor, or a farm machine. As an example, a vehicle guided along a path can include a van (such as a dry or refrigerated van), a tank trailer, a platform trailer, or an automobile carrier. As still yet another example, any vehicle described herein may include or use any appropriate voltage or current source, such as a battery, an alternator, a fuel cell, and the like, providing any appropriate current or voltage, such as about 12 volts, about 42 volts, and the like. As still yet another example, any of the vehicles described herein may include or use any desired system or engine. Those systems or engines may include items that use fossil fuels, such as gasoline, natural gas, propane, and the like, electricity, such as that generated by a battery, magneto, fuel cell, solar cell and the like, wind and hybrids or combinations thereof. As still yet another example, any vehicle described herein may include an electronic control unit (ECU), a data link connector (DLC), and a vehicle communication link that connects the DLC to the ECU.

A first end of the vehicle-to-display-device communication links 124, 126 may connect to a DLC within the vehicle 102 and a DLC within the vehicle 104, respectively, and a second end of the vehicle-to-display-device communication links 124, 126 may connect to the display device 102 and the display device 104, respectively. The vehicle-to-display-device communication links 124, 126 may include one or more conductors (e.g., copper wire conductors) or may be wireless. As an example, the vehicle-to-display-device communication links 124, 126 may include one or two conductors for carrying vehicle data messages in accordance with a vehicle data message (VDM) protocol. A VDM protocol may include a Society of Automotive Engineers (SAE) J1850 (PWM or VPW) VDM protocol, an International Organization of Standardization (ISO) 15764-4 controller area network (MAY) VDM protocol, an ISO 9141-2 K-Line VDM protocol, an ISO 14230-4 KWP2000 K-Line VDM protocol, or some other protocol presently defined or that may be defined in the future for performing communications within a vehicle.

The DLC may include an on-board diagnostics (OBD) II connector. An OBD II connector may include slots for retaining up to 16 connector terminals, but may include a different number of slots or no slots at all. As an example, a DLC may include an OBD II connector that meets the SAE J1962 specification such as a connector 16M, part number 12110252, available from Delphi Automotive LLP of Troy, Michigan. The DLC may include conductor terminals that connect to a conductor in the vehicle 102. For instance, the DLC may include connector terminals that connect to conductors that respectively connect to positive and negative terminals of a vehicle battery. The DLC may include one or more conductor terminals that connect to a conductor of the vehicle communication link such that the DLC is communicatively connected to the ECU. The display devices that are connectable to a vehicle may include a DB-25 connector, an Ethernet connector, a Universal Serial Bus connector or some other connector for connecting to the vehicle-to-display-device communication links 124, 126. Two or more devices described herein as being communicatively coupled to each other may be carried out using circuit-switched communication links, packet-switched communication links, or a combination of such communication links.

A display device, such as the display device 106 or 108, may operate through use of an electrical current provided to it from a vehicle battery by way of a DLC and a communication link, or by another electrical energy source. For example, the display devices 106, 108 may include an electrical energy source, such as a battery, or the display devices 106, 108 may receive an electrical current for its operation from an electrical energy source other than a vehicle or an internal battery, such as an alternating electrical current available at a wall outlet.

The ECU may control various aspects of vehicle operation or components within a vehicle, such as the vehicle 102. For example, the ECU may include a powertrain system ECU, an engine control module (ECM) ECU, a supplemental inflatable restraint system (i.e., an air bag system) ECU, an entertainment system ECU, or some other ECU. The ECU may receive inputs (e.g., a sensor input), control output devices (e.g., a solenoid), generate a vehicle data message (VDM) (such as a VDM based on a received input or a controlled output), and set a diagnostic trouble code (DTC) as being active or history for a detected fault or failure condition within the vehicle 102 and/or 104.

Transmission of a VDM may occur over the vehicle communication link within a vehicle. In that way, a VDM may be transmitted to the DLC and, in turn, to the display device 106 or 108 connected to the vehicle. A VDM may include data such as (i) an ECU identifier, (ii) a parameter identifier (PID), (iii) a mode identifier that identifies a current data mode, a freeze frame data mode, a vehicle information mode, a DTC mode, or some other mode, (iv) a parameter value, (v) data identifying a characteristic of the vehicle (e.g., a vehicle identification number (VIN)), or (vi) some other vehicle data. As an example, a VDM that indicates the engine revolutions per minute (RPM) of an engine within the vehicle 102 may comprise the hexadecimal data "41 0C 0F A0," where "41" represents a response to a mode 01 request, "0C" is a PID indicating engine RPM, and "0F A0" is the parameter value representing the RPM ($\frac{1}{4}$ RPM per bit). In this case, the hexadecimal value "0F A0" equals 4,000. At $\frac{1}{4}$ RPM per bit, the engine RPM represented by the example VDM is 1,000 RPM. The display devices 106, 108 may use data within one or more VDM to determine an operating condition of a vehicle that transmitted the VDM.

In accordance with the example embodiments in which a communication link, such as the vehicle-to-display-device communication link 124 or any other communication link described herein, communicates data wirelessly, such wireless communication of data may be carried out by radio in accordance with a wireless communication protocol (e.g., a wireless communication standard). As an example, a wireless communication protocol may include an Institute of Electrical and Electronics Engineers (IEEE) 802.15.1 standard for wireless personal area networks (PANs) or a Bluetooth version 4.1 standard developed by the Bluetooth Special Interest Group (SIG) of Kirkland, Washington. As another example, the wireless communication protocol may include an IEEE 802.11 standard for wireless LANs, which is sometimes referred to as a "Wi-Fi®️ standard." As another example, the wireless communication protocol may include a cellular phone standard, such as standard for 3G or 4G cellular phone communications developed by the 3rd Generation Partnership Project (3GPP). Other examples of a wireless communication protocol are also possible.

A gateway, such as gateway 112, gateway 116, or any other gateway described herein, may include a computing device that connects the network 114 to another computing device, such as the display device 106, 108, the server 118, or CVST 110. As an example, a gateway may include a router, a modem, an access point, a wiring hub, an Ethernet switch or some other device. A communication link, such as the display-device-to-gateway communication link 128 or 130, may include a wireless communication link, such as a Wi-Fi®️ communication link, or a wired communication link, such as an Integrated Service Digital Network, a Digital Subscriber Link, a coaxial cable, or a fiber optic cable. The network 114 may include a local area network (LAN), a metropolitan area network (MAN), or a wide area network (WAN). The network 114 may include the Internet or a portion thereof. The network 114 may include one or more of the gateway 112, the gateway 116, and the network communication links 132, 134.

In some examples, a CVST, such as CVST 110, or any other CVST described herein, may comprise a computing device, such as a mobile phone, tablet, or any one of the display devices described herein, among other computing devices. In other examples, a CVST may comprise an oscilloscope, voltmeter, or digital-volt-ohm meter, among other devices that may be configurable to repair, service, or maintain a vehicle. In some example embodiments, a CVST may connect to a display device via a communication link, such as display-device-to-CVST communication link 122. In other example embodiments, a display device or server may store information associated with the CVST.

The server 118 may include one or more servers, such as one or more of a communications server, an application server, a file server, a database server, and a web server. A server, such as server 118 or any other server described in this description may be referred to as a "computer server" or a "server computing device." The communications server and the web server may process requests transmitted over the network 114 from one or more of the display devices 106, 108. Those requests may be arranged according to a hyper-text transmission protocol (HTTP), a file transfer protocol (FTP), or according to another protocol. Processing a request by the server 118 may include searching the database 120 based on data included within the request.

The file server and the database server may provide access to the database 120 for storing data at the database 120 or for retrieving data stored at the database 120. The communications server or the web server may deliver responses to the network 114 for transmission to the one or more display devices 106, 108 that made the request processed by the server 118. The responses from the server 118 may be arranged according to the HTTP, the FTP, or another protocol. The application server may execute applications and handle connections between the communications server and the file server. In an embodiment in which the server 118 includes multiple servers, two or more of the multiple servers may be interconnected by a server-to-server communication link (not shown). The server 118 may connect to the gateway 116 by the server-to-gateway communication link 138.

The database 120 may include one or more databases. The database 120 may include a computer-readable medium. Each database of the database 120 may include data stored at a computer-readable medium. The database 120, or the computer-readable medium of the database 120, may connect to the server 118 by the server-to-database communication link 140.

In some embodiments, the server 118 may be configured to store in the database 120 a plurality of service scenarios defined for the display device 106, 108. A service scenario may include instructions on how to repair, service, or troubleshoot a vehicle based on the vehicle's operating condition or symptoms. In some embodiments, a service scenario may include vehicle manufacturer information, a vehicle symptom associated with the vehicle manufacturer information, and at least one location of a service flow chart associated with the vehicle manufacturer information and/or vehicle symptom.

Vehicle manufacturer information may include characteristics of the vehicle 102 or 104, such as a year (Y), make (M₁), model (M₂), engine (E), and system (S) pertaining to the vehicle 102 or 104. An abbreviation for such information may be used (e.g., $YM_1M_2ES$). The data identifying vehicle manufacturer information may include a vehicle identification number (VIN) or some portion of a VIN. The data identifying vehicle manufacturer information may include data that indicates characteristics of a plurality of vehicles having common characteristics (e.g., $YM_1M_2ES$, $YM_1M_2$, or $YM_1M_2E$). Additionally, the characteristics of a particular vehicle may include a serial number within the VIN. A vehicle characteristic may indicate a sub-model, an engine size, a fuel-type (e.g., diesel or unleaded), a region where the vehicle was built, or other characteristic(s) represented by the VIN.

The data identifying vehicle manufacturer information or characteristics of the vehicle, or at least of some of the characteristics of the vehicle, may be implied. For example, if a vehicle manufacturer manufactured a particular model only during the calendar or mode year 2014, then the year for such a vehicle may be implied by the data that identifies the make and model of the vehicle, such that the data identifying characteristics of the vehicle would not need to include the year.

In some embodiments, a service flow chart associated with vehicle manufacturer information may include instructions on how to configure a CVST to troubleshoot or repair a vehicle. In particular, the service flow chart of each service scenario may include instructions on how to configure the CVST 110 based on the capabilities of the CVST 110. For example, if CVST 110 is an oscilloscope, the server may store service scenarios that include setup instructions on how to configure the oscilloscope and take measurements using the oscilloscope to troubleshoot or repair a vehicle for a particular symptom. In another example, if CVST 110 is a mobile phone, the server may store service scenarios that include setup instructions on how to configure the mobile phone for taking specific sound measurements, and setup instructions on using the mobile phone's camera to take specific pictures of a vehicle component or system, among other setup instructions based on the capabilities of a mobile phone.

In accordance with an embodiment in which the database includes multiple databases, the database 120 may include a distributed database including at least a first database and a second database. The distributed databases may be communicatively coupled by a database communication link (not shown). The database communication link may include at least a part of the network 114. In accordance with that embodiment, the server 120 may include a single server that searches both the first database and the second database, or the server may include a first server to search the first database and a second server to search the second database. As an example, the first database may include data indicating various service scenarios. A second database may include data associated with various CVSTs available to service a vehicle, and a third database may include data indicating a set of instructions on how to service a vehicle using a particular CVST.

In some embodiments, the server 118 may receive data indicating an operating condition of the vehicle 102 and/or 104 from the display device 106 and/or 108. The operating condition may relate to the status of a system or component of the vehicle 102 and/or 104. For example, the operating condition may be a condition of the brakes, transmission, engine, entertainment system, steering, or suspension, among other systems of the vehicle 102 and/or 104. In other examples, the operating condition may be a condition of a brake caliper, brake shoe, or brake pad, among other vehicle components of the vehicle 102 and/or 104.

Based on the stored service scenarios in the database 120, and the received data indicating an operating condition, some examples may include the server 118 determining that a particular service scenario matches the operating condition of the vehicle 102 and/or 104. For example, the server may receive information indicating that a vehicle's sound system needs repair and a voltmeter is available as a CVST to repair or service the sound system. The server may include several stored service scenarios on how to use a voltmeter to repair or take measurements to troubleshoot a vehicle. Based on the stored service scenarios and the received data indicating the operating condition of the vehicle, the server may determine a particular service scenario that matches the particular vehicle type (e.g., make, year, model) and the particular symptom of the vehicle type (e.g., sound system). The particular service scenario may then include instructions on how to configure the voltmeter to repair or troubleshoot the particular vehicle's sound system.

Additionally or alternatively, the particular service scenario may include instructions based on a repair order and service procedures identified on the repair order. For instance, the repair order may list service procedures to take sound measurements, rotate and balance the tires, and/or flush the cooling system. A computing device, such as a server or display device, may determine aspects regarding each of the service procedures. For example, a server may determine procedural steps, required CVSTs, and/or specifications (e.g., fluid capacities, fastener torquing torqueing-requirements, fluid types).

In some embodiments, the server 118 may receive information indicating that the sound system of vehicle 102 and/or 104 needs repair and certain measurements must be taken to troubleshoot the issue. The server 118 may include a stored service scenario for repairing or servicing the particular vehicle's sound system. Based on this stored service scenario, which includes setup instructions to repair and/or take measurements related to the sound system of vehicle 102 and/or 104, the server 118 may determine a CVST that is available and has the capability to perform the instructions. For example, the server 118 may determine that the CVST 110 is available to service vehicle 104. The server 118 may then send the service scenario to a display device, such as display device 108, associated with the CVST or communicatively coupled to the CVST so that the CVST, such as CVST 110, can execute the service scenario using its capabilities. Within examples, the server 118 may provide electronically configurable instructions to the CVST 110 to configure CVST 110 with little or no user input, thereby allowing a user to take measurements without modifying the configuration settings of the CVST 110.

In some embodiments, the server 118 may determine a CVST that is available and has the capability to perform particular instructions of a service scenario by transmitting a message to the display device 106 and/or 108. The message, for example, may include a request for information to determine if the display device 106 and/or 108 is associated with a CVST that is available and has the capability to perform the particular instructions. In a more specific example, the server 118 may send a message to the display device 108 to determine if there is a CVST available to take measurements related to the sound system of vehicle 104. In response to the message, the display device 108 may send a reply message to the server 118 indicating whether the CVST 110 is available and can perform the particular instructions. For example, the display device 108 may send a message to the server 118 indicating that the CVST 110 is a voltmeter that is available and has the capability to take measurements (e.g., voltage readings) related to the sound system of the vehicle 104. In another example, the display device 108 may send a message to the server 118 indicating that the CVST 110 is a mobile phone that is available and has the capability to take sound measurements from the sound system of the vehicle 104.

In other embodiments, the server 118 may determine a CVST that is available and has the capability to perform instructions of a service scenario based on a unique model identifier associated with the display device 106 and/or 108, and a capability identifier associated with the model identifier. For example, the server 118 may identify each display device 106 and 108 based on a unique serial number of the display device 106 and 108. Each serial number may be linked or associated with at least one capability identifier. In particular, the server 118 may store a lookup table that correlates each serial number to at least one capability identifier. In some embodiments, the capability identifiers may include data representing capabilities of a particular CVST associated with the display device 106 and/or 108. In other embodiments, the capability identifiers may include data representing capabilities of multiple CVSTs associated with the display device 106 and/or 108. In a more specific example, the display device 108 may have a model identifier associated with capability identifiers. The capability identifiers of the display device 108 may represent capabilities of a mobile phone (e.g., taking a picture, recording sound). In another example the capability identifiers of the display device 108 may represent capabilities of a mobile phone and an oscilloscope, among other CVSTs.

In some embodiments, multiple CVSTs associated with a particular display device may have the capability to perform instructions of a service scenario. For example, the display device 110 may be associated with the CVST 110 and another CVST (not shown). CVST 110 may be a voltmeter, and the other CVST may be an oscilloscope. Both CVSTs may be capable of, for example, taking voltage readings related to the sound system of the vehicle 104. In some examples, the server 118 may send instructions on how to take voltage readings using either one of the CVSTs. In another example, the server 118 may choose a CVST based on one or more factors. For example, the server 118 may determine that a particular voltmeter associated with the display device 108 is easier to configure or use compared to a particular oscilloscope associated with the display device 108. Additionally or alternatively, the server 118 may determine that a particular oscilloscope provides more accurate measurements than a particular voltmeter associated with the display device 118. Other examples are possible.

III. Example Display Devices

Figure 2:
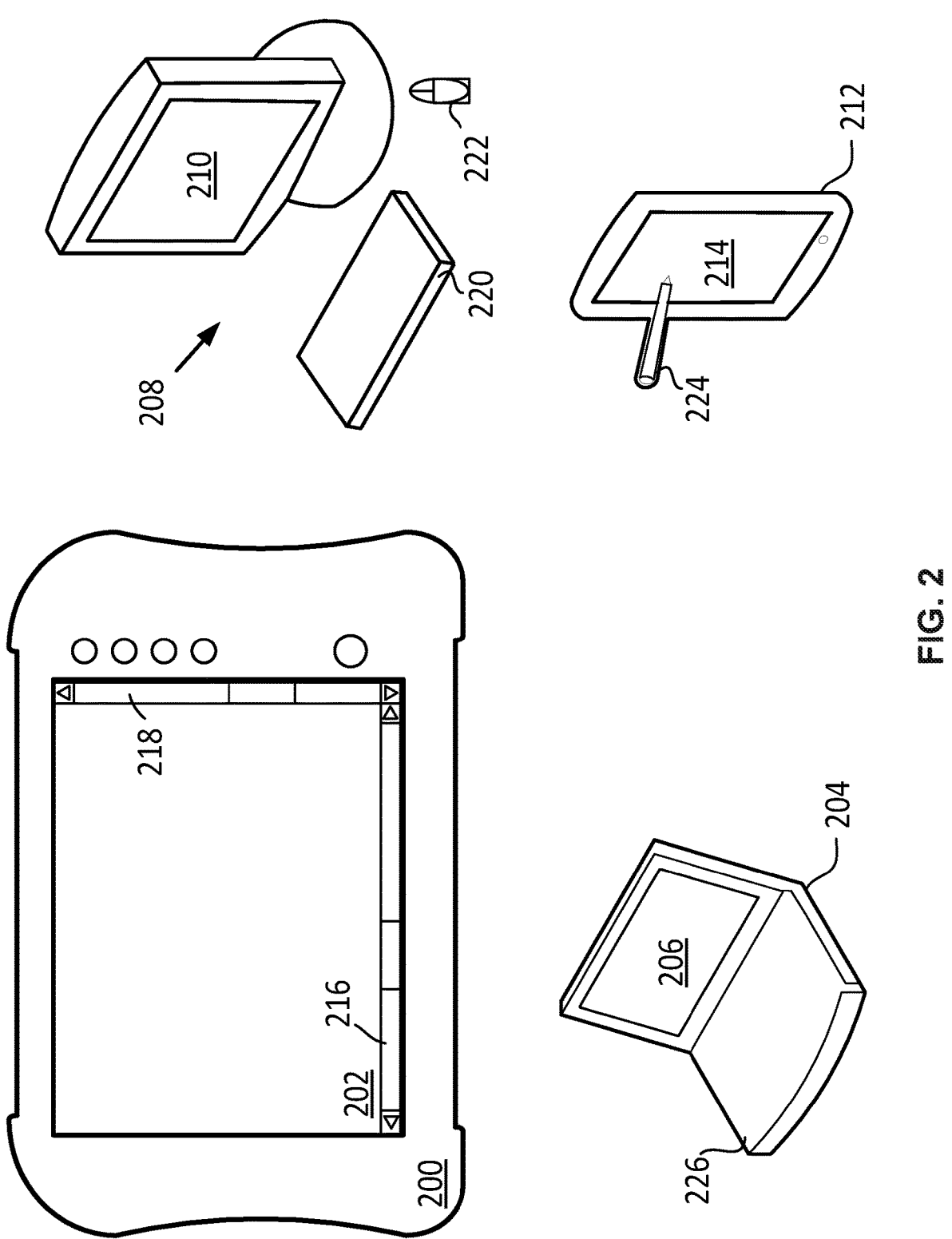
FIG. 2 shows example display devices in accordance with example embodiments.

FIG. 2 shows a plurality of example display devices having a display screen. The display devices in FIG. 2 may be functionally identical or similar to the display device 106 and 108 in FIG. 1. A first example display device shown in FIG. 2 is a display device 200 that includes a display 202. The display device 200 may include, or may be configured to operate as, a vehicle diagnostic device, the CVST 110, or at least as part of a vehicle diagnostic device or the CVST 110. A vehicle diagnostic device may connect to a vehicle, such as the vehicle 102, by a communication link, such as the vehicle-to-display-device communication link 124. As an example, the display device 200 may include, or may be configured as, a hand-held vehicle diagnostic device, such as a MODIS™ ultra integrated diagnostic system (reference number EEMS328 W) available from Snap-on Incorporated of Kenosha, Wisconsin.

Another example display device shown in FIG. 2 is a display device 208. The display device 208 may include a display 210, and may include one or more of a keyboard 220 and a pointing device 222. The display device 208 may include, or may be configured as, a desktop computing system. The keyboard 220 may include, or may be configured as, a wired or wireless QWERTY keyboard or some other keyboard for entering data or selections into the display device 208. The pointing device 222 may include, or may be configured as, a wired or wireless computer mouse. The display device 208 may include or be configured to operate as a vehicle diagnostic device or at least as part of a vehicle diagnostic device.

Yet another example display device shown in FIG. 2 is a display device 204. The display device 204 may include a display 206 and may include a keyboard 226. The display device 204 may include, or may be configured as, a laptop computing system. The display device 204 may include or be configured to operate as a vehicle diagnostic device, the CVST 110, or at least as part of a vehicle diagnostic device or the CVST 110.

In yet another example display device shown in FIG. 2 is a display device 212 having a display 214. The display device 212 may include, or may be configured as, a smartphone (such as an IPHONE® smartphone from Apple Inc., or a GALAXY S® smartphone from Samsung Electronics Co., Ltd.). Alternatively, the display device 212 may include, or may be configured as, a tablet device (such as an IPAD® tablet device from Apple Inc., or a SAMSUNG GALAXY TAB tablet device from Samsung Electronics Co., Ltd.). Data or selections may be entered at the display device 212 by way of a stylus 224 in contact with the display 214. Data or selections may be entered at the display device 212 in other ways as well. The display device 212 may include or be configured to operate as a vehicle diagnostic device, the CVST 110, or at least as part of a vehicle diagnostic device or the CVST 110.

The display screens 202, 206, 210, and 214 may include, or may be configured as, any example display described herein or some other type of display configured for displaying the displayable aspects described herein. A first example display includes or is configured as a capacitive touch display. A second example display includes or is configured as a resistive touch display. A third example display includes or is configured as a plasma display. A fourth example display includes or is configured as a light emitting diode (LED) display. A fifth example display includes or is configured as a cathode ray tube display. A sixth example display includes or is configured as an organic light-emitting diode (OLED) display, such as an active-matrix OLED or a passive-matrix OLED. A seventh example display includes or is configured as a touch-display such as a color touch used on a MODIS™ ultra integrated diagnostic system. An eighth example display includes or is configured as a backlit color liquid crystal display (LCD) having a resistive touch or panel.

As shown in FIG. 2, the display 202 may display a horizontal scroll bar 216 and a vertical scroll bar 218. The horizontal scroll bar 216 may be used to cause the display device 200 to display an unseen portion of a displayable page at the display 202 instead of another portion of the displayable page currently displayed at the display 202. The vertical scroll bar 218 may be used to cause the display device 200 to display another unseen portion of the displayable page at the display 202 instead of the portion of the displayable page currently displayed at the display 202. Any other display described herein may include a horizontal scroll bar configured to operate like the horizontal scroll bar 216. Any other display described herein may include a vertical scroll bar configured to operate like the vertical scroll bar 218.

Figure 3:
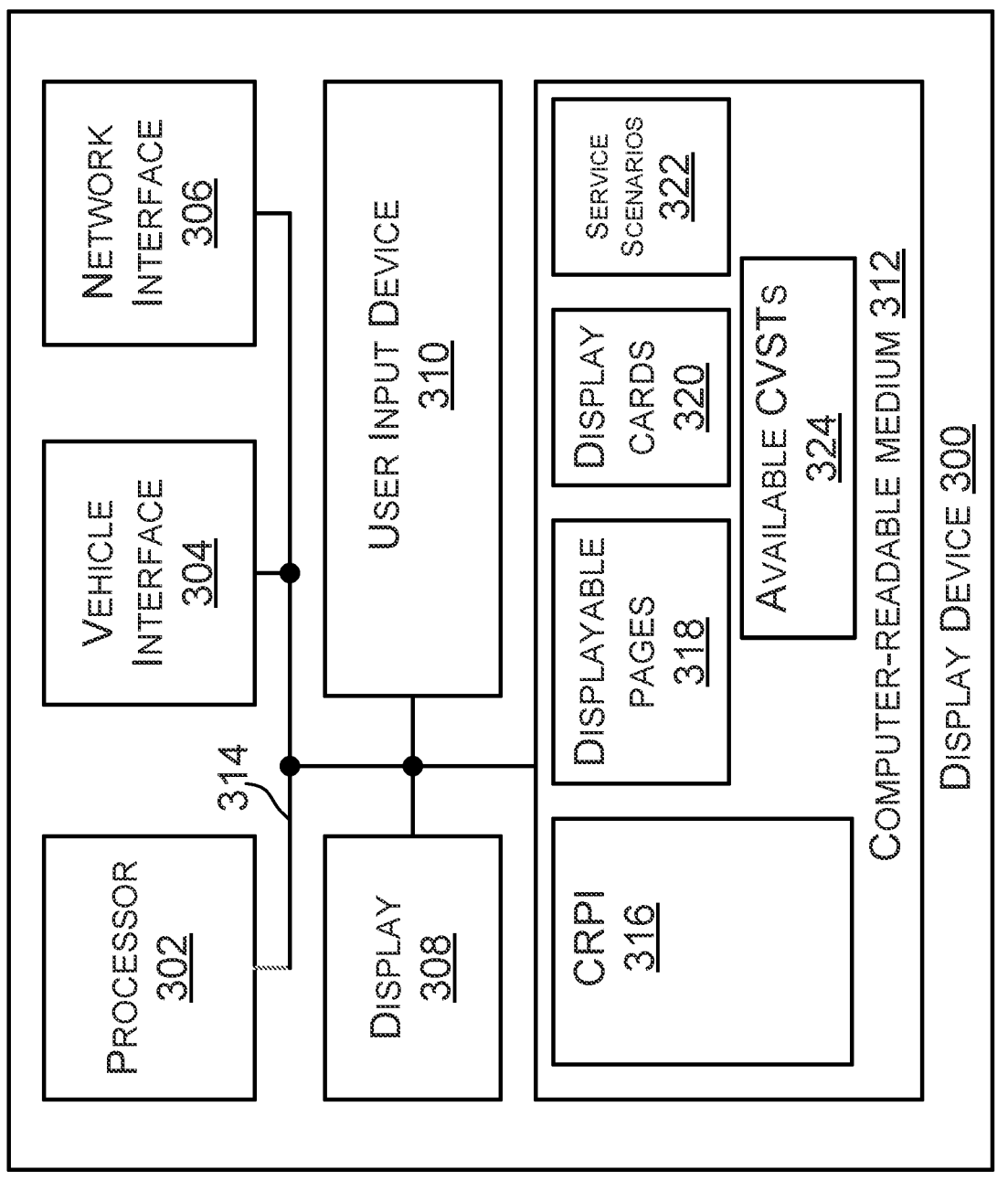
FIG. 3 shows a block diagram of an example display device.

FIG. 3 is a block diagram of a display device 300. The display device 300 may include all of the components shown in FIG. 3 or any proper subset of the components shown within the display device in FIG. 3. For example, the display device 300 may include a processor 302, a vehicle interface 304, a network interface 306, a display 308, a user input device 310, and a computer-readable medium (CRM) 312. Two or more of the aforementioned components shown in FIG. 3 may be communicatively coupled or linked together via a system bus, network, or other connection mechanism 314. A display device (e.g., display device 106, 108) shown in FIG. 1 may include, or may be configured as, the display device 300. The display device shown in FIG. 1 may include all or any proper subset of the components of the display device 300. Two or more of the components shown within the display device 300 may be located within a single housing. Two or more of the components shown within the display device 300 may be located remotely from each other in different housings or otherwise.

A processor, such as the processor 302 or any other processor discussed in this description or included within a device or system described in this description (hereinafter, "a described processor"), may include one or more general purpose processors (e.g., INTEL® single core microprocessors or INTEL® multicore microprocessors) or one or more special purpose processors (e.g., digital signal processors or graphics processors). A graphics processor may be configured to access and use the CRM 312 for creating, or retrieving from the display pages 318, a displayable page to display on the display 308. Additionally or alternatively, a described processor may include an application specific integrated circuit (ASIC). A described processor may be configured to execute computer-readable program instructions (CRPI), such as CRPI 316 stored in the CRM 312. A described processor may be configured to execute hard-coded functionality in addition to or as an alternative to software-coded functionality (e.g., via CRPI).

A computer-readable medium, such as the CRM 312 or any other computer-readable medium discussed in this description or included within a device or system described in this description, may include a non-transitory computer-readable medium, a transitory computer-readable medium, or both a non-transitory computer-readable medium and a transitory computer-readable medium. In one respect, a non-transitory computer-readable medium may be integrated in whole or in part with a processor. In another respect, a non-transitory computer-readable medium, or a portion thereof, may be separate and distinct from a processor.

A non-transitory computer-readable medium may include, for example, a volatile or non-volatile storage component, such as an optical, magnetic, organic or other memory or disc storage. Additionally or alternatively, a non-transitory computer-readable medium may include, for example, a random-access memory (RAM), a read-only memory (ROM), a programmable read-only memory (PROM), an erasable programmable read-only memory (EPROM), an electrically erasable programmable read-only memory (EE-PROM), a compact disk read-only memory (CD-ROM), or another memory device that is configured to provide data or CRPI to a processor.

A transitory computer-readable medium may include, for example, CRPI provided over a communication link, such as a communication link which is connected to or is part of the network 114. The communication link may include a digital or analog communication link. The communication link may include a wired communication link or a wireless communication link.

A computer-readable medium may be referred to by other terms such as a "computer-readable storage medium," a "data storage device," a "memory device," a "memory," or a "computer-readable database." Any of those alternative terms may be preceded with the prefix "transitory" or "non-transitory."

The CRM 312 may store all of the computer-readable elements shown in the CRM 312 in FIG. 3 or any proper subset of the computer-readable elements shown within the CRM 312. For example, the CRM 312 may store the CRPI 316, the displayable pages 318, display cards 320, and service scenarios 322. A first example of a proper subset of the computer-readable elements of CRM 312 is the CRPI 316, the displayable pages 318, and the display cards 320. A second example of a proper subset of the computer-readable elements of CRM 312 is the CRPI 316, and the service scenarios 322. Other examples of a proper subset of the computer-readable elements of the CRM 312 are also possible, such as the CRPI 316 and the available CVSTs 324. Other examples of computer-readable elements stored within the CRM 312 are also possible.

In some examples, service scenarios may be generated by the display device 300. The display device 300 may receive a service scenario contained in the service scenarios 322 at the network interface 306 via the network 114. The service scenarios 322 may include one or more service scenarios. As previously described, each service scenario may include vehicle manufacturer information, a vehicle symptom associated with the vehicle manufacturer information, repair orders, and at least one location of a service flow chart associated with the manufacturer information. Additionally or alternatively, service scenarios may be received by the network interface 306 from a device remote from the display device 300, such as the server 118 or server 400 described in further detail herein.

In some embodiments, a service scenario stored in the service scenarios 322 or received from server 118 or 400 may be displayed at the display 308. Displaying a service scenario may include displaying the service scenario as at least part of a displayable page 318. The display cards 320 may include display cards that make up at least a portion of a displayable page. The display cards 320 may include data received from the server 118 for initially displaying a particular display card or for updating the particular display card. The display 308 may display any aspect of any service scenario described herein. In some examples, the display 308 may display any visually-presentable data provided by the processor 302 or the CRM 312.

The vehicle interface 304 may include one or more components for communicatively coupling the display device 300 to a vehicle over a communication link. The vehicle interface 304 may include a transceiver (e.g., an integrated transmitter and receiver, or a distinct transmitter and a distinct receiver). The transmitter of the vehicle interface 304 may be configured to transmit data to a vehicle. The data transmitted by the vehicle interface 304 to the vehicle may include a request for a VDM. The receiver of the vehicle interface 304 may be configured to receive data transmitted by the vehicle 102 over the vehicle-to-display-device communication link 124. As an example, the transceiver of the vehicle interface can comprise a transceiver such as a system basis chip with high speed CAN transceiver 33989 provided by NXP Semiconductors, Eindhoven, Netherlands. The data received by the vehicle interface 304 from the vehicle 102 may include a VDM. The processor 302 may select data from within the VDM received from the vehicle and cause the selected data to be displayed at the display 308. As an example, the display 308 may display the selected data within a display card.

The network interface 306 may include one or more components for communicatively coupling the display device 300 to the network 114 or to a gateway that is part of or connected to the network 114. The network interface 306 may include component(s) for wireless or wired communications via the network 114. A network interface, such as the network interface 306 or any other network interface described in this description may include a modem, a network interface card, and/or a chip mountable on a circuit board. As an example, the chip can comprise a CC3100 Wi-Fi® network processor available from Texas Instruments, Dallas, Texas, a CC256MODx Bluetooth® Host Controller Interface (HCl) module available from Texas instruments, and/or a different chip for communicating via Wi-Fi®, Bluetooth® or another communication protocol.

The network interface 306 may receive various messages transmitted over the network 114. As an example, the network interface 306 may receive a message that includes setup instructions of a service scenario. In some examples, the network interface 306 may receive data indicating the capabilities of a CVST. For instance, display device 300 may receive, from a server, a message that includes identifiers of the manufacturer and device type of a CVST based on the part numbers and/or description of the CVST. The display device 300 may determine the capabilities of a CVST based on the received message.

The available CVSTs 324 may comprise a list of all CVSTs that are available and the corresponding capabilities of each CVST. In some instances, availability of a CVST may be based on whether the CVST is registered to the display device 300. A user may register a CVST with the server or the display device by providing registration information corresponding to the CVST. Additionally or alternatively, availability of a CVST may be based on a status of whether a particular CVST is in use and/or whether the particular CVST is connected (e.g., communicatively coupled) to the display device. For example, the display device may determine and display status information with respect to a CVST. The status information may include, for example, that a CVST is unpaired (e.g., not connected via Bluetooth) or unavailable. A CVST may be unavailable if the CVST is lost, sent in for repair, damaged, loaned to another user, or at a location far away from the display device. In further examples, the status information may include that a CVST is connected (e.g., communicatively coupled to the display device) and/or ready for use. A CVST may be ready for use if, for example, the CVST has been successfully configured with the setup instructions received from the server, such as server 400.

In some instances, available CVSTs 324 may comprise locations of the CVST, and the display device 300 may display the locations. For example, the display device may display that a first CVST is located in a first toolbox in a first room. In other example, the display device may display that a second CVST is located in a second toolbox in the first room. Other examples involving different locations are possible.

In some embodiments, the network interface 306 may receive data indicating that a CVST was configured according to a particular service scenario, and service data or measurements produced by the CVST. In other examples, the network interface 306 may receive a message that includes data for displaying a service scenario with displayable pages or sections, such as a DIAGNOSE displayable page or section, a JOB PREVIEW displayable page or section, a REPAIR displayable page or section, or a JOB SUMMARY displayable page or section, or a message to update some portion (e.g., a display card) of a displayable page or section. As another example, the network interface 306 may receive a message that includes a display card, the data to include in a display card, or the data for modifying a display card. Other examples are possible.

The user input device 310 may include user-input elements configured so that a user of display device 300 may input data for use by the processor 302 or by another element of the display device 300. As an example, the user-input elements may include a connection to the display 308 in an embodiment in which the display 308 includes a touch display. As another example, the user-input elements may include a user input section having one or more input keys. As another example, the user-input elements may include a pointing device such as a computing device mouse, a keyboard (e.g., a QWERTY keyboard), a joystick, a display pointer (e.g. the pointing device 222 shown in FIG. 2), or a microphone for receiving spoken inputs. As yet another example, the user-input elements may include a scanner configured to scan a one or two dimensional code (e.g., a bar code or a quick-response (QR) code). The user input device 310 can include one or more electrical circuits that carry electrical signals indicative of input data to the processor 302. As an example, an electrical signal provided to the processor 302 can indicate vehicle manufacturer information, vehicle symptom information, selection of a CVST, selection of a service instruction, or some other input data.

In general, CRPI, such as the CRPI 316 or any other CRPI described herein, include program instructions executable by a processor. Further, and in general, CRPI may include various structures, modules, routines, or some other computer-readable logic. Further, and in general, CRPI may be written using a computer-programming language such as C++ or some other programming language.

In particular, the CRPI 316 may include program instructions executable by the processor 302 to carry out any one or more functions described herein or represented by the figures as being performed, at least in part, by the display device 300 or a component of the display device 300, or any other display device described herein. As an example, the CRPI 316 may include program instructions to generate a service scenario or some portion of a service scenario. The program instructions to generate a service scenario may include program instructions to perform any or all of the functions described herein.

IV. Example Servers

Figure 4:
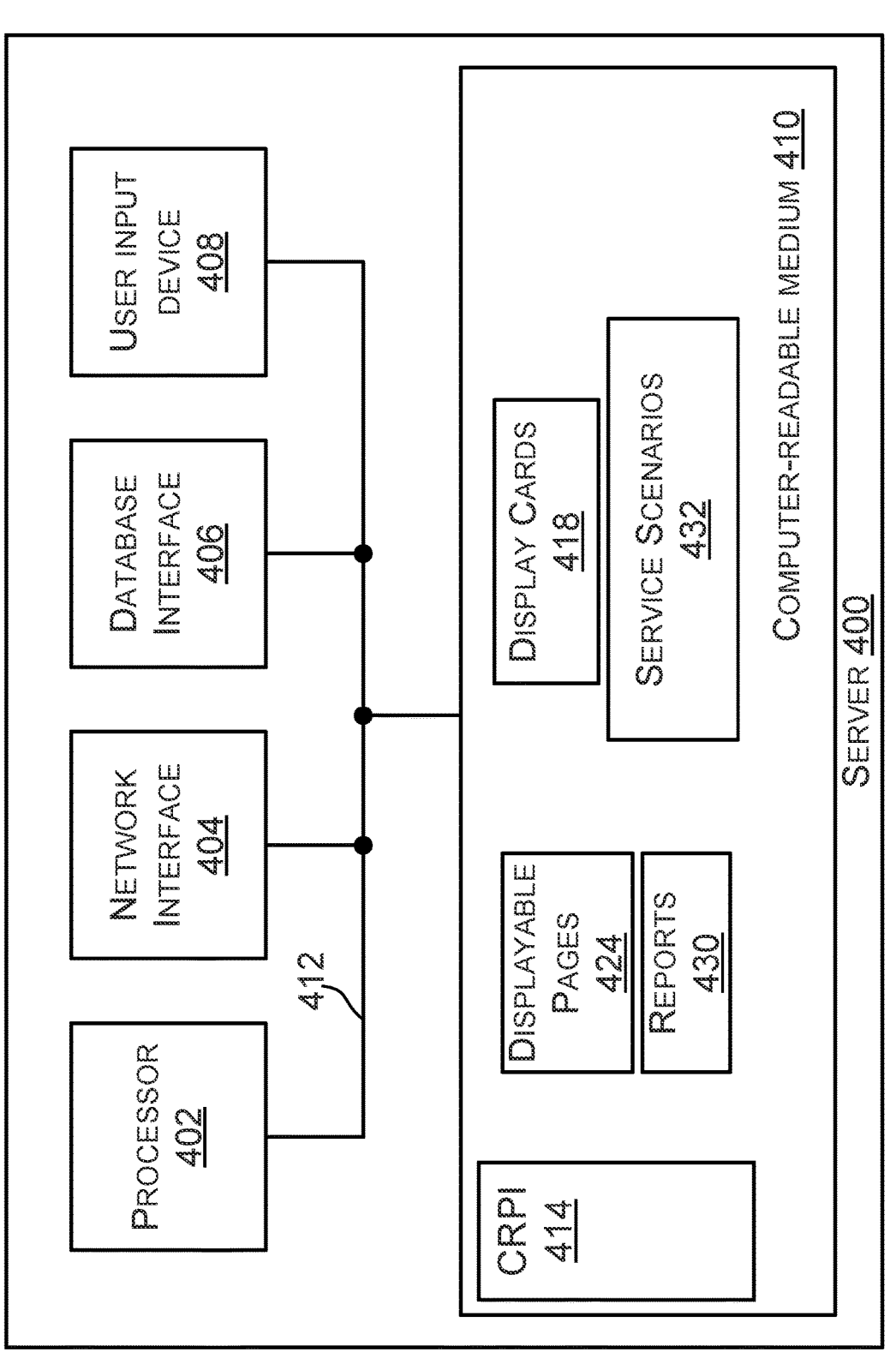
FIG. 4 shows a block diagram of an example server.

FIG. 4 is a block diagram of a server 400. The server 400 may include all of the components shown in FIG. 4 or any proper subset of the components shown within the server 400. For example, the server 400 may include a processor 402, a network interface 404, a database interface 406, a user input device 408, and a computer-readable medium 410. Two or more of the aforementioned components shown in FIG. 4 may be communicatively coupled or linked together via a system bus, network, or other connection mechanism 412. The server 118 shown in FIG. 1 may include, or may be configured as, the server 400. The server 118 may include all or any proper subset of the components of the server 400.

Two or more of the components shown within the server 400 may be located within a single housing. Two or more of the components shown within the server 400 may be located remotely from each other in different housings or otherwise.

The server 400 may take the place of the server 118 shown in FIG. 1. The computer-readable medium 410 may include the database 120. The computer-readable medium 410 may include at least some of the data stored in the database 120. As an example, the data stored in both the computer-readable medium 410 or the database 120 may include one or more of CRPI 414, display cards 418, displayable pages 424, reports 430, and service scenarios 432.

The network interface 404 may include one or more components for communicatively coupling the server 400 to the network 114 or to a gateway (e.g., gateway 116) that is part of or connected to the network 114. The network interface 404 may include component(s) for wireless or wired communications via the network 114. The network interface 404 may include a modem or a network interface card. The network interface 404 may include a receiver to receive the various data described as being transmitted over the network to a server 118 or 400 or described as being received by the server 118 or 400 or the network interface 404. The network interface 404 may include a transmitter to transmit the various data described as being transmitted by the network interface 404, the processor 402, the server 400 or the various data described as being received by a display device 106, 108, 110, or 300 or the network interface 306.

The database interface 406 may include one or more components for requesting data from the database 120 and one or more components for receiving data from the database 120. The database interface 406 may include the server-to-database communication link 140. The processor 402 may transmit the requests to the database interface 406 and over the server-to-database communication link 140. The database interface 406 may transmit the data it receives from the database 120 to the processor 402.

The user input device 408 may include one or more components for entering (e.g., inputting) data into the server 400 or modifying data stored in the computer-readable medium 410 or the database 120 or for use by the processor 402. As an example, the components of the user input device 408 may include a display screen, a user input section having one or more input keys, a pointing device such as a computing device mouse, a keyboard (e.g., a QWERTY keyboard), a display pointer (e.g. the pointing device 222 shown in FIG. 2), or a microphone for receiving spoken inputs.

The computer-readable medium 410 may include CRPI 414. The processor 402 may execute the CRPI 414. The CRPI 414 may include program instructions to perform any function described herein as being performed by a server, such as the server 118 or the server 400, or by any component described herein as being a component of a server.

For example, the CRPI 414 may include program instructions to perform each of the functions or any portion described with respect to the functions of the set of functions shown in FIG. 5.

As another example, the CRPI 414 may include program instructions executable by the processor 402 to generate a report, such as a final report generated after the vehicle 102 or 104 is repaired. The server 400 may store the report in the reports 430. The server 400 may perform analytics on multiple reports for determining the data to provide within display cards.

The displayable pages 424 may include current-request data that defines which display cards pertain to a displayable page or section that can be presented by the display device 300. The displayable pages 424 may also include current-view data that defines which display cards are presently displayed by one or more display devices. The server 400 may use the current-view data to retrieve data for other display cards, such as display cards adjacent to the display cards presently displayed by the one or more display devices. The display cards 418 may include card-definition data that defines the type of data to be populated into each display card.

The server 400 may receive data indicating an operating condition of a vehicle from one or more display devices previously described herein. The one or more display devices may be configured to display vehicle service information via the displayable pages of the server 400 provides to the display devices or the data to populate the display cards within the displayable pages having display cards. The server 400 may execute the CRPI 414 based on the received data the service scenarios 432 stored in CRM 410.

V. Example Methods

FIG. 5 illustrates a flowchart of an example method 500 that can be implemented within an operating environment including or involving, for example, system 100 of FIG. 1, display devices 200 of FIG. 2, display device 300 of FIG. 3, and the server 400 of FIG. 4. Method 500 may also be applied to other systems, display devices, and servers having different arrangements and/or different components than those described herein. Further, method 500 may include one or more operations, functions, or actions as illustrated by one or more of blocks 502-510. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Method 500 begins at block 502, which includes a server, such as server 118 of FIG. 1, storing a plurality of service scenarios defined for at least one display device, wherein each stored service scenario includes at least one setup instruction and wherein each setup instruction is based on at least on capability of at least one CVST. Each service scenario may include vehicle manufacturer information, a vehicle symptom associated with the vehicle manufacturer information, and at least one location of a service flow chart associated with the manufacturer information as previously described herein.

The service flow chart may provide instructions on how to configure a CVST to troubleshoot or repair a vehicle. In particular, the service flow chart of each service scenario may include instructions on how to configure a particular CVST based on the capabilities of the CVST. For example, a CVST may be an oscilloscope. The server may store service scenarios that include setup instructions on how to configure the oscilloscope and take measurements using the oscilloscope to troubleshoot or repair a vehicle for a particular symptom. In another example, a CVST may be a mobile phone. The server may store service scenarios that include setup instructions on how to configure the mobile phone for taking specific sound measurements, and setup instructions on using the mobile phone's camera to take specific pictures of a vehicle component or system, among other setup instructions based on the capabilities of a mobile phone. In some embodiments, the server may provide electronically configurable instructions to the CVST (e.g., directly to the CVST or via a display device communicatively coupled to the CVST and server) to configure the CVST with little or no user input, thereby allowing the user to take measurements without modifying the configuration settings of the CVST. For example, an oscilloscope may be configured via configuration instructions provided via the server such that the oscilloscope may be used to take measurements without additional instructions or inputs provided by a user to configure the oscilloscope (e.g., time settings) before taking such measurements.

Figure 6A:
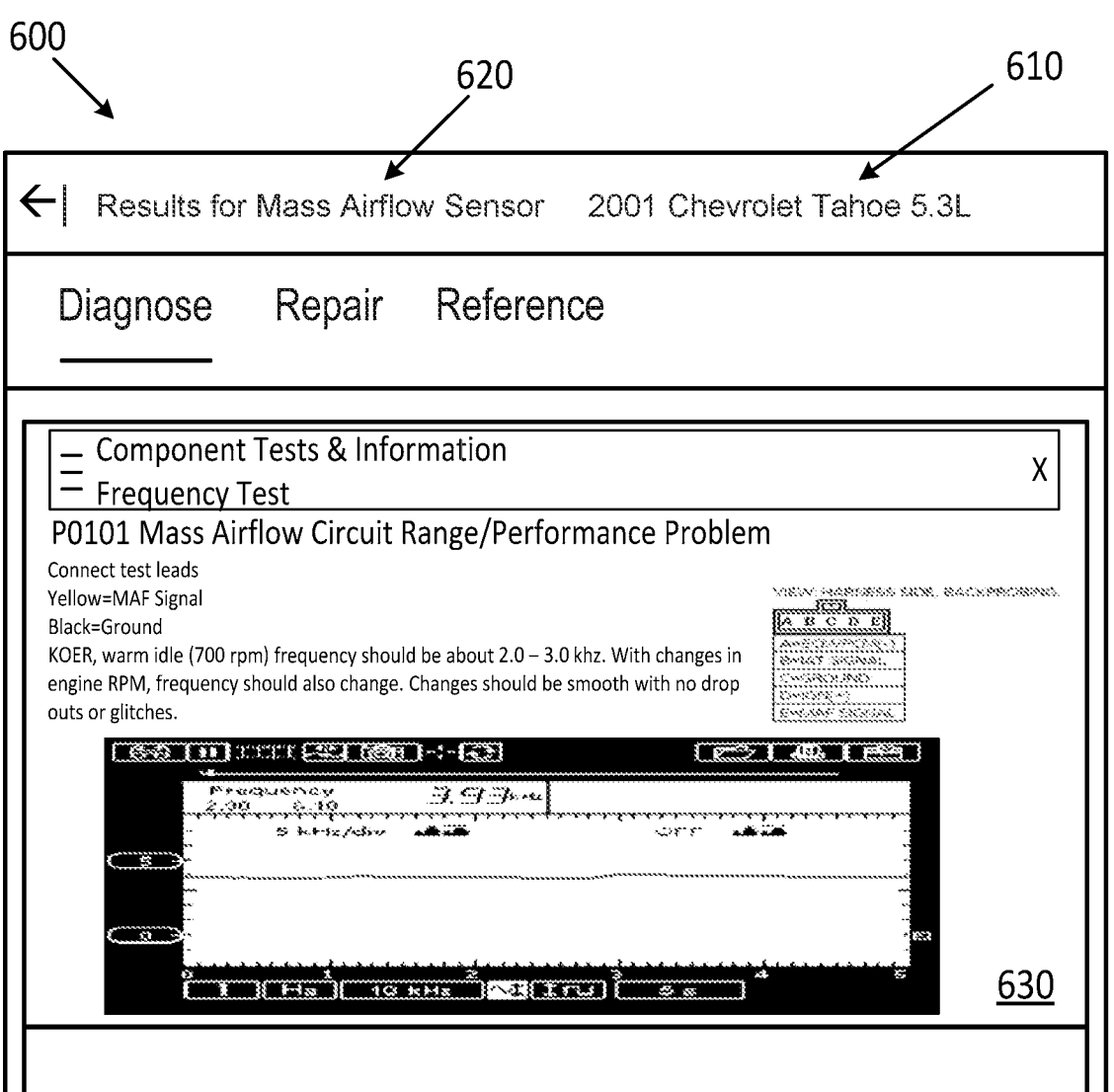
FIGS. 6A-6B show example service scenarios in accordance with example embodiments.
Figure 6B:
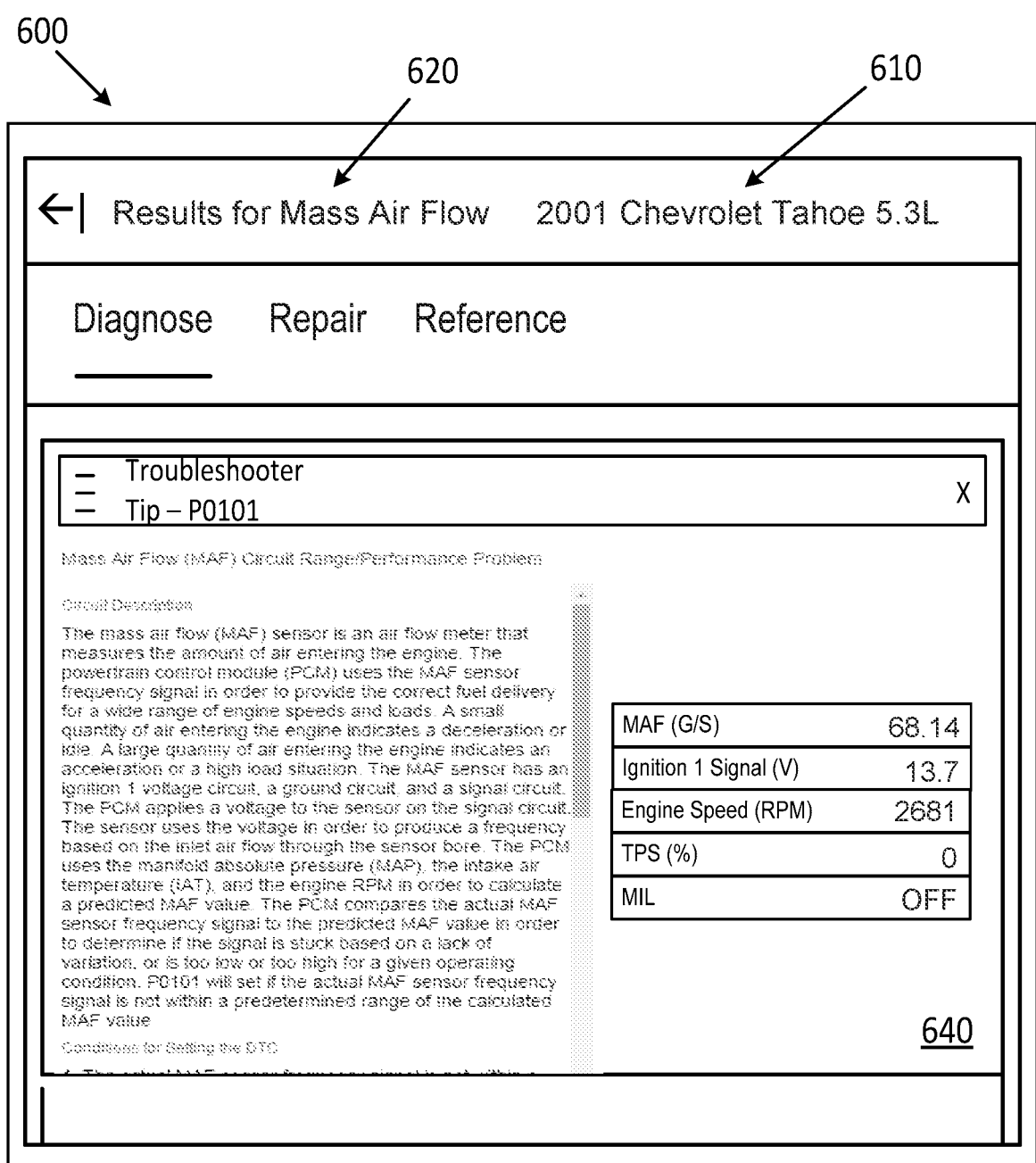

FIGS. 6A and 6B illustrate a more specific example of a service scenario that may be displayed via a display device or server. In particular, FIG. 6A illustrates an example service scenario 600 that includes information on how to configure a CVST, such as an oscilloscope, to take frequency measurements. As shown, the service scenario 600 may include vehicle manufacturer information 610, a vehicle symptom 620 associated with the particular vehicle being serviced, and a service flow chart 630. In some embodiments, the vehicle symptom 620 may be a diagnostic trouble code (DTC) (e.g., P0101) associated with a particular vehicle problem (e.g., mass air flow circuit range/performance problem). The service flow chart 630 includes a screenshot that displays configuration settings for the oscilloscope to troubleshoot the vehicle symptom 620. The screenshot, for example, includes the time per division setting. Additionally, service flow chart 630 includes instructions on how to connect the oscilloscope to the vehicle to take frequency measurements. Further, service flow chart 630 includes expected results to help diagnose or service a vehicle.

FIG. 6B further illustrates the service scenario 600 according to an example embodiment. As shown, the service scenario 600 may further include background information related to the vehicle component that may be faulty of needs repair, and more detailed symptoms to help diagnose the condition of a vehicle. Additionally, the service scenario 600 may include an image of the vehicle component that may be faulty or needs repair. The service scenario may further include predetermined values for a particular vehicle component (e.g., mass air flow sensor) to further help diagnose a vehicle condition.

In some embodiments, as shown in FIGS. 6A and 6B, a service scenario may include instructions on how to repair the diagnosed condition of the vehicle using a particular CVST (e.g., "Repair" tab). Additionally, a service scenario may include references (e.g., "Reference" tab) that provide additional information. The additional information may include data indicative of how a particular symptom or vehicle condition was resolved previously for the particular vehicle model. In some embodiments, the additional information may be data indicative of a particular CVST a vehicle service technician or a community of users may have used, how the CVST was used, and how successful that test was in diagnosing, repairing, or servicing a vehicle condition. This additional information may provide the benefit of confirming a successful vehicle repair and may bolster the service scenarios with real life examples and known-good test results for specific vehicle types.

In some embodiments, the server may store service scenarios which may include instructions that take more of a digital form (e.g., configuration instructions). The instructions may configure various CVSTs described herein with little or no additional user input. Most CPU-controlled CVSTs may be configurable with such instructions. For example, the time settings, vertical axis, number of channels, or any other settings within a digital lab scope may be configurable with little or no additional user input. In some instances, the instructions may configure software parameters (e.g., upper and lower data thresholds) of a CVST (e.g., digital voltmeter, lab scope). Within examples, the instructions may configure mobile device parameters via APIs. For instance, the instructions may launch the camera of a mobile phone or computing device via a mobile application or website. In other instances, the setup instructions may configure a mobile phone or other CVST so that a mobile application or website utilizes the accelerometer of the mobile phone or CVST. In other examples, the setup instructions may configure hardware parameters so that a CVST (e.g., multimeter or lab scope) properly measures data in accordance with the instructions.

In other embodiments in which a particular CVST is not fully configurable, the server may store instructions which may be provided to the display device such that a user can manually enter the parameters in the instructions for the particular CVST. In some instances in which multiple CVSTs are available, instructions for respective CVSTs may be provided to the display device. Such instructions may provide fully configurable and/or manual instructions for respective CVSTs. In some embodiments, a user (e.g., an experienced technician) may select a particular CVST and one or more stored instructions for the particular CVST.

At block 504, method 500 may include the server receiving data indicating an operating condition of a vehicle from a first display device of the at least one display device. For example, the server 118 may receive data indicating an operating condition of the vehicle 104 from the display device 106. The operating condition may relate to the status of a vehicle system or component as previously described herein. For example, the operating condition may be a condition of a vehicle's brakes, transmission, engine, entertainment system, steering, or suspension, among other systems. In other examples, the operating condition may be a condition of a vehicle's brake caliper, brake shoe, or brake pad, among other vehicle components.

Additionally, the server may receive data indicating a vehicle's manufacturer information. Vehicle manufacturer information may include characteristics of the, such as a year (Y), make ($M_1$), model ($M_2$), engine (E), and system (S) pertaining to the vehicle. The data identifying vehicle manufacturer information may include a vehicle identification number (VIN) or some portion of a VIN. In some embodiments, the data identifying vehicle manufacturer information may include data that indicates characteristics of a plurality of vehicles having common characteristics (e.g., $YM_1M_2ES$, $YM_1M_2$, or $YM_1M_2E$). In other embodiments, the characteristics of a particular vehicle may include a serial number within the VIN. A vehicle characteristic may indicate a sub-model, an engine size, a fuel-type (e.g., diesel or unleaded), a region where the vehicle was built, or other characteristic represented by the VIN.

In one respect, the data received by the server at block 504 can include one or more VDM that the display device receives from an ECU within the vehicle with the operating condition. In another respect, the data received by the server at block 504 can comprise data the display device extracts from one or more VDM from the vehicle with the operating condition. The data from the VDM can, for example, include one or more diagnostic trouble codes and/or one or more OBD II parameters and OBD II parameter identifiers or some other parameters and parameter identifiers from an ECU in the vehicle.

Based on the stored plurality of service scenarios and the received data indicating the operating condition of the vehicle, at block 506, method 500 may include the processor of the server determining a first stored service scenario of the plurality of service scenarios matches the operating condition of the vehicle. For example, the server may receive information indicating that a vehicle's mass airflow sensor needs repair and an oscilloscope is available as a CVST to repair or service the mass airflow sensor. The server may include several stored service scenarios on how to use an oscilloscope to repair or take measurements to troubleshoot a vehicle. Based on the stored service scenarios and the received data indicating the operating condition of the vehicle, the server may determine a particular service scenario, such as service scenario 600, that matches the particular vehicle type (e.g., make, year, model) and the particular symptom of the vehicle type (e.g., mass airflow sensor). The particular service scenario, such as service scenario 600, may then include instructions on how to configure the oscilloscope to repair or troubleshoot the particular vehicle's mass airflow sensor.

In another example, the server may receive information indicating that a vehicle's mass airflow sensor needs repair and certain measurements must be taken to troubleshoot the issue. The server may include a stored service scenario that includes a service flow chart for repairing or servicing the particular vehicle's mass airflow sensor. Based on this stored service scenario, which includes setup instructions to repair and/or take measurements related to the vehicle's mass airflow sensor, the server may determine a CVST that is available and has the capability to perform the instructions. The server may then send the service scenario to a display device associated with the CVST or communicatively coupled to the CVST so that the CVST can execute the service scenario using its capabilities.

Another example may involve two or more CVSTs that may be available to repair or service a vehicle. In particular, the server may receive information indicating that a vehicle's sound system needs repair and certain measurements must be taken to troubleshoot the issue. The server may include a stored service scenario for repairing or servicing the particular vehicle's sound system. Based on this stored service scenario, which includes setup instructions to repair and/or take measurements related to the vehicle's sound system, the server may determine multiple CVSTs that are available and has the capability to perform the instructions. The server may then send the service scenario to a display device associated with one of the CVSTs or communicatively coupled to one of the CVSTs so that the CVST can execute the service scenario using its capabilities. In some embodiments, the server may send multiple service scenarios to the display device associated with each CVST. In other embodiments, the server may select a particular service scenario based on an order of precedence previously described herein.

At block 508, method 500 may include the processor of the server determining a first CVST having a first capability that is associated with the first display device. For example, the server may determine that a mobile phone is communicatively coupled to a display device and has the capability to take sound measurements. In another example, the server may determine that a voltmeter is communicatively coupled to a display device, or is available based on data received from the display device, and has the capability to take voltage readings.

In some embodiments, the server may determine a CVST that is available and has the capability to perform particular instructions of a service scenario by transmitting a message to a display device. The message, for example, may include a request for information to determine if the display device is associated with a CVST that is available and has the capability to perform the particular instructions. In a more specific example, the server may send a message to the display device to determine if there is a CVST, such as an oscilloscope, available to take measurements related to a vehicle's sound system. In response to the message, the display device may send a reply message to the server indicating whether there is such a CVST available that can perform the particular instructions. For example, the display device may send a message to the server indicating that a voltmeter is available and has the capability to take measurements (e.g., voltage readings) related to a vehicle's sound system. In another example, the display device may send a message to the server indicating that a mobile phone is available and has the capability to take sound measurements from the vehicle's sound system.

In some embodiments, the server may determine a CVST that is available and has the capability to perform instructions of a service scenario based on a model identifier associated with a particular display device, and a capability identifier associated with the model identifier. For example, multiple display devices may be communicatively coupled to the server. The server may identify each display device based on a model identifier or serial number of the display device. Each model identifier may be linked or associated with at least one capability identifier. For example, the server may store a lookup table that correlates each model identifier to at least one capability identifier. In some embodiments, the capability identifiers may include data representing capabilities of a particular CVST associated with a display device.

In other embodiments, the capability identifiers may include data representing capabilities of multiple CVSTs associated with a display device. Ina particular example, the server may be communicatively coupled to two display devices. The first display device may have a first model identifier associated with capability identifiers. For example, the capability identifiers of the first display device may represent capabilities of a mobile phone (e.g., taking a picture, recording sound). In another example the capability identifiers of the first display device may represent capabilities of a mobile phone and an oscilloscope, among other CVSTs.

In some embodiments, multiple CVSTs associated with a particular display device may have the capability to perform instructions of a service scenario. For example, a display device may be associated with a voltmeter and an oscilloscope. Both CVSTs may be capable of, for example, taking voltage readings related to a vehicle's sound system. In some examples, the server may send instructions on how to take voltage readings using either one of the CVSTs. In another example, the server may choose a CVST based on one or more factors. For example, the server may determine that a particular voltmeter associated with a display device is easier to configure or use compared to a particular oscilloscope associated with the display device. Additionally or alternatively, the server may determine that a particular oscilloscope provides more accurate measurements than a particular voltmeter associated with the display device. Other examples are possible.

At block 510, method 500 may include the server transmitting the first stored service scenario to the first display device, wherein the first stored service scenario comprises a first setup instruction that is based on the first CVST having the first capability. For example, the server may transmit instructions on how to configure and/or use a particular mobile phone to take sound measurements or capture images of a vehicle system or component. In another example, the server may transmit instructions on how to configure and/or use a particular voltmeter to take certain measurements related to a vehicle system or component.

In some embodiments, the server may receive service data indicating that a particular CVST was set up based on a setup instruction of a service scenario. The server may receive the service data from the display device and/or the particular CVST. The server may then store the received service data and/or update the stored service scenarios in its database that is defined for at least one display device. In some instances, the stored service scenarios may be updated based on how successful a given scenario or instruction was (e.g., probability of success) in repairing or diagnosing a particular vehicle. In other instances, the stored service scenarios may be updated based on seasonal changes that may affect vehicle conditions. In further instances, the stored service scenarios may be updated based on user feedback or input from a user's experience in diagnosing or repairing a particular vehicle with a particular scenario or instruction. For example, a user may provide the mileage of a particular vehicle being repaired. Such additional information may supplement the probability of success data of stored scenarios for a particular vehicle, and may help build a library of stored service scenarios that provide even more accurate instructions for future repairs of the particular vehicle. Additionally, storing the service data and updating the stored service scenario ensures that the most up-to-date information is used in diagnosing, repairing, or servicing a vehicle.

FIG. 7 illustrates a flowchart of an example method 700 that can be implemented within an operating environment including or involving, for example, system 100 of FIG. 1, display devices 200 of FIG. 2, display device 300 of FIG. 3, and the server 400 of FIG. 4. Method 700 may also be applied to other systems, display devices, and servers having different arrangements and/or different components than those described herein. Further, method 700 may include one or more operations, functions, or actions as illustrated by one or more of blocks 702-706. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

Method 700 begins at block 702, which includes a display device, such as display device 108 of FIG. 1, transmitting data indicating an operating condition of a vehicle. For example, the display device 108 may transmit data indicating an operating condition of the vehicle 104 to the server 118. The operating condition may relate to the status of a vehicle system or component as previously described herein.

Additionally, the display device may send data indicating a vehicle's manufacturer information. Vehicle manufacturer information may include characteristics of the, such as a year (Y), make ($M_1$), model ($M_2$), engine (E), and system (S) pertaining to the vehicle. The data identifying vehicle manufacturer information may include a vehicle identification number (VIN) or some portion of a VIN. In some embodiments, the data identifying vehicle manufacturer information may include data that indicates characteristics of a plurality of vehicles having common characteristics (e.g., $YM_1M_2ES$, $YM_1M_2$, or $YM_1M_2E$). In other embodiments, the characteristics of a particular vehicle may include a serial number within the VIN. A vehicle characteristic may indicate a sub-model, an engine size, a fuel-type (e.g., diesel or unleaded), a region where the vehicle was built, or other characteristic represented by the VIN.

At block 704, method 700 may include the display device receiving a first stored service scenario, wherein the first stored service scenario comprises a first setup instruction that is based on a first configurable vehicle service tool (CVST) having a first capability and the operating condition of the vehicle. In some embodiments, the first capability may be, for example, a measurement mode of a particular CVST. In other embodiments, the first capability may be an oscilloscope time per division setting, an oscilloscope volt per division setting, an oscilloscope trigger setting, a vehicle bus communication protocol, or any other setting that may be applicable to configuring a CVST.

In operation, based on the operating condition of the vehicle 104, server 118 may send the display device 108 instructions on how to configure the CVST 110 that has the capability to take certain measurements to service a particular condition of the vehicle 104. In particular, the first setup instruction may be an instruction on how to configure a mobile phone to take certain sound measurements to service a vehicle's sound system. In some examples, the first setup instructions may be instructions on how to configure a voltmeter and/or how to use the voltmeter. Additionally or alternatively, the first setup instruction may be a configurable instruction to electronically configure the CVST, thereby allowing a user to take measurements with the CVST without modifying the configuration settings of the CVST.

In some embodiments, the display device may receive multiple setup instructions simultaneously or sequentially based on an order of precedence or based on multiple factors. The factors may be based on ease of use or accuracy of a particular CVST associated with the display device as previously described herein. Additionally, the factors may be based on the capabilities of a given CVST. In some embodiments, a setup instruction may comprise alternative or sequential instructions based on measurements taken using a previous setup instruction. In a particular example, a display device may first receive an instruction to use a first CVST (e.g., mobile phone) to take specific pictures of a vehicle's system or component. The display device may additionally or sequentially (e.g., after taking the specific pictures) receive an instruction to further utilize the first CVST to take certain measurements (e.g., sound measurements using a mobile phone) of a vehicle. In some embodiments, the display device may additionally or sequentially receive an instruction to use a second CVST (e.g., a voltmeter), a configurable instruction to configure the second CVST, and receive further instructions to take certain measurements with the second CVST to help troubleshoot or service a vehicle.

In some embodiments, before receiving the first setup instruction of the first stored service scenario from the server, the method 700 may include the display device determining at least one CVST associated with the display device that has the first capability. For example, if the first capability is a capability to take sound measurements, the display device may determine that there are CVSTs such as a mobile phone and a digital sound level meter that is available and capable of taking sound measurements. In response to determining that there is a mobile phone and a digital sound level meter capable of taking sound measurements, the method 700 may further include the display device sending data related to the availability and capability of the mobile phone and digital sound level meter to the server.

As noted above, availability of a CVST may be based on whether the CVST is registered to the display device. A user may register a CVST with the server or the display device by providing registration information corresponding to the CVST. Additionally or alternatively, availability of a CVST may be based on a status of whether a particular CVST is in use and/or whether the particular CVST is connected (e.g., communicatively coupled) to the display device. For example, the display device may determine and display status information with respect to a CVST. The status information may include, for example, that a CVST is unpaired (e.g., not connected via Bluetooth) or unavailable. A CVST may be unavailable if the CVST is lost, sent in for repair, damaged, loaned to another user, or at a location far away from the display device. In further examples, the status information may include that a CVST is connected (e.g., communicatively coupled to the display device) and/or ready for use. A CVST may be ready for use if, for example, the CVST has been successfully configured with the setup instructions received from the server. In other embodiments, the display device may receive a message from a server. The message may include a request for information to determine if the display device is associated with a CVST that has a particular capability. For example, the display device may be communicatively coupled to a mobile phone, oscilloscope, a sound level meter, and a voltmeter, or at least know the availability of such CVSTs. The server may send a message to the display device to check if the display device has an oscilloscope capable of taking frequency measurements. In another example, the server may send a message to the display device to check if the display device has any CVST capable of taking sound measurements. Other examples are possible.

In further embodiments, in response to receiving the message from the server, the display device may send a reply message that indicates the availability and capability of at least one CVST that the server is looking for. For example, in response to a request by the server to check if the display device has any CVST capable of taking sound measurements, the display device may send a message to the server indicating that a mobile phone and a sound level meter are available and capable of taking the sound measurements. In another example, in response to a request by the server to check if the display device has an oscilloscope capable of taking frequency measurements, the display device may send a reply message indicating that there is an oscilloscope available and capable of taking the frequency measurements. Additionally, the reply message may include the make, year, model, or firmware/software version of the CVST that has the requested capability.

In response to receiving the first setup instruction of the first stored service scenario, at block 706, method 700 may include the display device configuring the first CVST to use the first capability associated with the first service scenario. For example, the display device may receive an instruction from the server on how to configure and/or use an oscilloscope to take frequency measurements. In particular, the instruction may contain the measurement mode and range, time per division setting, and/or volt per division setting for the oscilloscope. In response to receiving such instruction, the display device may configure the oscilloscope accordingly.

After the display device configures the first CVST to use the first capability associated with the first service scenario, some embodiments may include the display device sending service data produced by the first CVST. In some embodiments, the display device may further send data indicating that the first CVST was setup based on the first setup instruction when the service data was produced. For example, the display device may send data indicating that an oscilloscope was configured in accordance with the measurement mode and range specified in the service scenario. The display device may also send data indicating the results of the frequency measurement taken with the oscilloscope in accordance with the service scenario.

Based on the sent service data, some embodiments may include the display device repeating at least one of the blocks 702-706 of method 700. For example, after the display device sends the service data produced by the first CVST associated with the first service scenario, the display device may transmit data indicating an updated operating condition of a vehicle. In some embodiments, the display device may receive a new setup instruction based on the first CVST having a second capability. For example, a mobile phone may have been initially used to take pictures of a vehicle component as part of the first setup instruction. The display device may receive new instructions on configuring the mobile phone to take sound measurements. Alternatively, the display device may receive a new instruction on how to configure a second CVST, such as a voltmeter, to take other measurements necessary to service the vehicle.

VI. Conclusion

It should be understood that the arrangements described herein and/or shown in the drawings are for purposes of example only. As such, those skilled in the art will appreciate that other arrangements and elements (e.g., machines, interfaces, functions, orders, and/or groupings of functions) can be used instead, and some elements can be omitted altogether according to the desired results. Furthermore, various functions described and/or shown in the drawings as being performed by one or more elements can be carried out by a processor executing computer-readable program instructions or by a combination of hardware, firmware, and/or software. For purposes of this description, execution of CRPI contained in some computer-readable medium to perform some function can include executing all of the program instructions of those CRPI or only a portion of those CRPI.

While various aspects and embodiments are described herein, other aspects and embodiments will be apparent to those skilled in the art. The various aspects and embodiments disclosed herein are for purposes of illustration and are not intended to be limiting, with the true scope being indicated by the claims, along with the full scope of equivalents to which such claims are entitled. It is also to be understood that the terminology used herein for the purpose of describing particular embodiments only, and is not intended to be limiting.

Embodiments of the present disclosure can thus relate to one of the enumerated example embodiment (EEEs) listed below.

EEE 1 is a method performed by a server, the method comprising: storing a plurality of service scenarios defined for at least one display device, wherein each stored service scenario comprises at least one setup instruction, and wherein each setup instruction is based on at least one capability of at least one configurable vehicle service tool (CVST); receiving data indicating an operating condition of a vehicle from a first display device of the at least one display device; based on the stored plurality of service scenarios and the received data, determining, by a processor of the server, that a first stored service scenario of the plurality of service scenarios matches the operating condition; determining, by the processor of the server, a first CVST having a first capability that is associated with the first display device; and transmitting the first stored service scenario to the first display device, wherein the first stored service scenario comprises a first setup instruction that is based on the first CVST having the first capability.

EEE 2 is the method of EEE 1, wherein determining the first CVST having the first capability that is associated with the first display device further comprises: transmitting, by the server, a first message to the first display device, wherein the first message comprises an identifier of the first capability and a request for information to determine if the first display device is associated with the first CVST having the first capability; and in response to transmitting the first message, receiving, by the server, a second message from the first display device, wherein the second message comprises a response to the request for information of the first message.

EEE 3 is the method of EEE 1 or 2, further comprising: storing data in a database comprising model identifiers of each of the at least one display device and at least one capability identifier associated with each model identifier, and, for each capability identifier, data representing a capability of a given CVST; wherein determining the first CVST having the first capability that is associated with the first display device comprises (i) determining a first model identifier of the first display device, (ii) requesting from the database the at least one capability identifier associated with the first model identifier, and (iii) determining a capability represented by the at least one capability identifier associated with the first model identifier.

EEE 4 is the method of any one of EEE 1 to 3, wherein the first stored service scenario further comprises a second setup instruction, wherein the second setup instruction is based on a second capability of the first CVST, and wherein the first stored service scenario defines an order of precedence with respect to performing the first setup instruction and the second setup instructions, the method further comprising: determining, by the processor of the server, the order of precedence; and providing, by the first display device to the first CVST, the first setup instruction and the second instruction for performance by the first CVST according to the order of precedence.

EEE 5 is the method of EEE 4, further comprising: determining the second setup instruction has an earlier precedence in the order of precedence than the first setup instruction.

EEE 6 is the method of any one of EEE 1 to 5, further comprising: determining, by the processor of the server, a second CVST having the first capability that is associated with the first display device; and wherein the first stored service scenario further comprises a second setup instruction that is based on the second CVST having the first capability.

EEE 7 is the method of any one of EEE 1 to 6, wherein the first setup instruction comprises an instruction to configure the first CVST for the first capability.

EEE 8 is the method of any one of EEE 1 to 7, wherein the first CVST comprises an oscilloscope, a digital-volt-ohm meter, or a vehicle scan tool arranged to receive vehicle data messages from the vehicle and to transmit vehicle data messages to the vehicle.

EEE 9 is the method of any one of EEE 1 to 8, wherein the first stored service scenario comprises manufacturer information, at least one location of a service flow chart associated with the manufacturer information, and a vehicle symptom associated with the manufacturer information.

EEE 10 is the method of any one of EEE 1 to 9, wherein the first display device comprises the first CVST.

EEE 11 is the method of any one of EEE 1 to 10, wherein the first display device comprises a mobile computing device.

EEE 12 is the method of any one of EEE 1 to 11, further comprising: receiving, by the server from at least one of the first display device or the first CVST, service data produced by the first CVST and data indicating the first CVST was set up based on the first setup instruction when the service data was produced; storing the service data received by the server; and updating the stored plurality of service scenarios defined for at least one display device based on the stored service data received by the server.

EEE 13 is the method of any one of EEE 1 to 12, wherein the first CVST comprises a vehicle scan tool arranged to receive vehicle data messages from the vehicle and to transmit vehicle data messages to the vehicle, wherein the first setup instruction comprises instructions to configure the first CVST to transmit one or more vehicle data messages to a particular electronic control unit within the vehicle, wherein the first setup instruction comprises instructions to configure the first CVST to transmit to the first display device parameter values the first CVST receives from the vehicle in response to the one or more vehicle data messages, wherein the display device is arranged to transmit to the server the parameters values transmitted by the first CVST to the display device, and wherein the method further comprises: receiving, by the processor of the server, the parameter values transmitted by the first display device to the server; determining, by the processor of the server a diagnosis of the operating condition of the vehicle based on the parameter values received by the server; and transmitting data indicative of the diagnosis of the operating condition of the vehicle to the display device.

EEE 14 is a method performed by a display device coupled to at least one server by a communication network, the method comprising: transmitting data indicating an operating condition of a vehicle; receiving a first stored service scenario, wherein the first stored service scenario comprises a first setup instruction that is based on a first configurable vehicle service tool (CVST) having a first capability and the operating condition of the vehicle; and in response to receiving the first stored service scenario, configuring the first CVST with the first setup instruction to use the first capability associated with the first service scenario.

EEE 15 is the method of EEE 14, wherein the display device comprises the first CVST.

EEE 16 is the method of EEE 14 or 15, further comprising: transmitting, by the display device to the at least one server, (i) service data produced by the first CVST associated with the first service scenario and (ii) data indicating the first CVST was set up based on the first setup instruction when the service data was produced.

EEE 17 is the method of any one of EEE 14 to 16, further comprising: before receiving the first setup instruction of the first stored service scenario, determining, by the display device, at least one CVST associated with the display device, wherein the at least one CVST has the first capability; and in response to determining the at least one CVST has the first capability, transmitting, by the display device to the at least one server, data indicating the at least one CVST has the first capability.

EEE 18 is the method of any one of EEE 14 to 17, further comprising: receiving, by the display device, a first message from the at least one server, wherein the first message includes a request for information to determine if the display device is associated with the first CVST having the first capability, and in response to receiving the first message, transmitting, by the display device, a second message to the at least one server, wherein the second message comprises a response to the request for information of the first message.

EEE 19 is the method of any one of EEE 14 to 18, wherein the first capability is selected from at least one of the following: (i) a measurement mode, (ii) a measurement range, (iii) an oscilloscope time per division setting, (iv) an oscilloscope volt per division setting, (v) an oscilloscope trigger setting, or (vi) a vehicle bus communication protocol.

EEE 20 is a computing system comprising: a computer-readable medium having stored thereon a plurality of computer-readable service scenarios for at least a first display device, wherein each stored service scenario comprises at least one setup instruction, wherein each setup instruction is based on at least one capability of at least one configurable vehicle service tool (CVST); a network interface configured for transmitting and receiving communications via at least one communication network; and at least one processor coupled to the computer-readable medium and to the network interface, wherein the at least one processor is programmed to; receive data indicating an operating condition of a vehicle from the first display device; determine, based on the stored plurality of service scenarios and the received data, a first stored service scenario of the plurality of service scenarios that matches the operating condition; determine a first CVST having a first capability that is associated with the first display device; and transmit the first stored service scenario via the network interface to the first display device, wherein the first stored service scenario comprises a first setup instruction that is based on the first CVST having the first capability.

EEE 21 is the computing system of EEE 20, further comprising: the first display device; and the at least one CVST.

EEE 22 is the computing system of EEE 20 or 21, further comprising instructions, wherein the at least one processor is further programmed to: transmit a first message to the first display device, wherein the first message comprises a request for information to determine if the first display device is associated with the first CVST having the first capability; and in response to transmitting the first message, receive a second message from the first display device, wherein the second message comprises a response to the request for information of the first message.

EEE 23 is the computing system of any one of EEE 20 to 22, wherein the first stored service scenario further comprises a second setup instruction, wherein the second setup instruction is based on a second capability of the first CVST, and wherein the at least one processor is further programmed to: determine an order of precedence in providing the first setup instruction and the second setup instruction, wherein the first stored service scenario defines the order of precedence; and determine the second setup instruction has an earlier precedence in the order of precedence than the first setup instruction.

EEE 24 is the computing system of any one of EEE 20 to 23, wherein the at least one processor is further programmed to: determine a second CVST having the first capability that is associated with the first display device; and wherein the first stored service scenario is further comprises a second setup instruction that is based on the second CVST having the first capability.

EEE 25 is the computing system of any one of EEE 20 to 24, wherein the first setup instruction comprises an instruction to configure the first CVST for the first capability.

EEE 26 is the computing system of any one of EEE 20 to 25, wherein the first stored service scenario comprises manufacturer information, at least one location of a service flow chart associated with the manufacturer information, and a vehicle symptom associated with the manufacturer information.

EEE 27 is the computing system of any one of EEE 20 to 26, wherein the at least one processor is further programmed to: receive, from at least one of the first display device or the first CVST, service data produced by the first CVST and data indicating the first CVST was set up based on the first setup instruction when the service data was produced; store the service data received by the server; and update the stored plurality of service scenarios defined for at least one display device based on the stored service data received by the server.

EEE 28 is the computer-readable medium having stored thereon program instructions executable by at least one processor to cause a computing system to perform functions comprising: storing a plurality of service scenarios defined for at least one display device, wherein each stored service scenario comprises at least one setup instruction, and wherein each setup instruction is based on at least one capability of at least one configurable vehicle service tool (CVST); receiving data indicating an operating condition of a vehicle from a first display device of the at least one display device; based on the stored plurality of service scenarios and the received data, determining a first stored service scenario of the plurality of service scenarios matches the operating condition; determining a first CVST that is associated with the first display device, wherein the first CVST has a first capability to perform the first setup instruction of the first stored service scenario; and transmitting the first stored service scenario to the first display device, wherein the first stored service scenario comprises a first setup instruction that is based on the first CVST having the first capability.

EEE 29 is the computer-readable medium of EEE 28, wherein the program instructions executable by the at least one processor causes the computing system to perform functions further comprising: transmitting a first message to the first display device, wherein the first message comprises a request for information to determine if the first display device is associated with the first CVST having the first capability; and in response to transmitting the first message, receiving a second message from the first display device, wherein the second message comprises a response to the request for information of the first message.

EEE 30 is the computer-readable medium of EEE 28 or 29, wherein the first stored service scenario further comprises a second setup instruction, and wherein the second setup instruction is based on a second capability of the first CVST, and wherein the program instructions executable by the at least one processor causes the computing system to perform functions further comprising: determining an order of precedence in providing the first setup instruction and the second setup instruction, wherein the first stored service scenario defines the order of precedence; and determining the second setup instruction has an earlier precedence in the order of precedence than the first setup instruction.

EEE 31 is the computer-readable medium of any one of EEE 28 to 30, wherein the program instructions executable by the at least one processor causes the computing system to perform functions further comprising: determining a second CVST having the first capability that is associated with the first display device; and transmitting the first stored service scenario to the first display device, wherein the first stored service scenario further comprises a second setup instruction that is based on the second CVST having the first capability.

EEE 32 is a server comprising at least one processor; and a computer readable medium storing program instructions that when executed by the at least one processor, cause a set of functions to be performed, the set of functions comprising a method in accordance with any one of EEE 1 to 13.

EEE 33 is a computer-readable medium storing program instructions, that when executed by a computing device, cause a set of functions to be performed, the set of functions comprising a method in accordance with any one of EEE 1 to 13.

EEE 34 is a display device comprising at least one processor; and a computer readable medium storing program instructions that when executed by the at least one processor, cause a set of functions to be performed, the set of functions comprising a method in accordance with any one of EEE 14 to 19.

EEE 35 is a computer-readable medium storing program instructions, that when executed by a computing device, cause a set of functions to be performed, the set of functions comprising a method in accordance with any one of EEE 14 to 19.

We claim:

1. A method comprising:
receiving, at a vehicle interface of a computing system, one or more vehicle data messages from a vehicle via a wired communication link connecting the vehicle interface of the computing system to a data link connector within the vehicle, wherein:
the one or more vehicle data messages include data indicating an operating condition of the vehicle,
the computing system includes a configurable vehicle service tool, the vehicle interface, a processor, a non-transitory computer-readable memory, and a display, and
the vehicle interface includes a transceiver configured to transmit requests for vehicle data messages onto the wired communication link and to receive vehicle data messages transmitted onto the wired communication link by the vehicle;
determining, at the computing system based at least in part on the data indicating the operating condition of the vehicle, a first service scenario stored in the non-transitory computer-readable memory, wherein:
the first service scenario includes first setup instructions, and
the first setup instructions include a computer-executable instruction to modify configuration settings corresponding to a measurement capability of the configurable vehicle service tool without any user input and a computer-executable instruction to perform an electrical measurement via the configurable vehicle service tool;
modifying, at the computing system, the configuration settings corresponding to the measurement capability of the configurable vehicle service tool without any user input via execution of the first setup instructions;
performing the electrical measurement via the configurable vehicle service tool after modifying the configuration settings corresponding to the measurement capability of the configurable vehicle service tool without any user input, wherein the electrical measurement includes a voltage measurement, a current measurement, or a resistance measurement;
generating, at the computing system, service data indicative of the electrical measurement; and
outputting the service data on the display.

2. The method of claim 1, further comprising:

determining, at the computing system, characteristics of the vehicle represented by any one or more of the following five identifiers:

a vehicle model year identifier pertaining to the vehicle, a vehicle make identifier pertaining to the vehicle, a vehicle model identifier pertaining to the vehicle, an engine identifier pertaining to the vehicle, and a system identifier pertaining to the vehicle, and wherein determining the first service scenario is further based on the computing system determining the first service scenario is associated with vehicles having the characteristics of the vehicle.

3. The method of claim 1, further comprising:

transmitting, by the computing system to a server, the data indicating the operating condition of the vehicle;

receiving, at the computing system from the server, the first service scenario; and storing the first service scenario in the non-transitory computer-readable memory.

4. The method of claim 1, wherein the data indicating the operating condition of the vehicle includes data indicating an operating condition of a vehicle component on the vehicle, and/or data indicating a status of a vehicle system on the vehicle.

5. The method of claim 1, wherein:

the first service scenario further includes second setup instructions, the first service scenario defines an order of precedence with respect to performing the first setup instructions and the second setup instructions, the method further comprises:

determining, by the computing system, the order of precedence, and executing the second setup instructions;

wherein execution of the first setup instructions and the second setup instructions occurs according to the order of precedence.

6. The method of claim 5, further comprising:

determining the second setup instructions have an earlier precedence in the order of precedence than the first setup instructions.

7. The method of claim 5, wherein the order of precedence is based on one or more from among: an ease of use factor regarding the configurable vehicle service tool, a capability of the configurable vehicle service tool, or an accuracy of the configurable vehicle service tool.

8. The method of claim 1, wherein the configurable vehicle service tool includes an oscilloscope, a multimeter, or a digital-volt-ohm meter.

9. The method of claim 1, wherein the first service scenario is based on and/or includes one or more from among:

vehicle manufacturer information including one or more characteristics of the vehicle, a repair order, a service flow chart associated with the vehicle manufacturer information, or a vehicle symptom associated with the vehicle manufacturer information.

10. The method of claim 1, further comprising:

transmitting the service data from the computing system to a server for updating the first service scenario based on the service data.

11. The method of claim 1, further comprising:

generating, by the computing system, a displayable page on the display, wherein outputting the service data on the display includes displaying the service data within the displayable page.

12. The method of claim 11, wherein the displayable page includes a display card, and wherein displaying the service data within the displayable page includes displaying the service data within the display card.

13. The method of claim 1, wherein the electrical measurement is representative of a duty cycle, a pressure, a frequency, or a temperature.

14. The method of claim 1, wherein:

the configurable vehicle service tool includes an oscilloscope, and modifying the configuration settings of the configurable vehicle service tool without any user input via execution of the first setup instructions includes changing one or more from among:

a measurement mode of the oscilloscope, a measurement range for the oscilloscope, a time per division setting of the oscilloscope, a volts per division setting of the oscilloscope, a selection of a number channels of the oscilloscope, or a trigger setting of the oscilloscope.

15. The method of claim 1, wherein:

the configurable vehicle service tool includes a multimeter, and modifying the configuration settings of the configurable vehicle service tool without any user input via execution of the first setup instructions includes changing a measurement mode of the multimeter from one of a voltage, current, resistance, duty cycle, pressure, or temperature mode to a second different one of the voltage, current, resistance, duty cycle, pressure, or temperature mode and/or range of the multimeter.

16. The method of claim 1, wherein the operating condition of the vehicle indicates an electronic control unit in the vehicle has set a diagnostic trouble code as active or history, and/or is based on a parameter identifier and parameter value contained in the data indicating the operating condition of the vehicle.

17. The method of claim 1, wherein the first service scenario includes an image of a vehicle component, and wherein the method further includes outputting the image on the display.

18. The method of claim 1, further comprising:

outputting vehicle service information on the display.

19. The method of claim 1, wherein the first service scenario further includes information for confirming a successful vehicle repair and/or a known good test result.

20. The method of claim 1, wherein:

the first service scenario includes second setup instructions, the first setup instructions and the second setup instructions are alternative instructions, the method further comprises determining, at the computing system, a previous measurement, and the first setup instructions are selected for execution instead of the second setup instructions based on the previous measurement.

21. The method of claim 1, wherein the first service scenario further includes textual and/or graphical information for connecting the configurable vehicle service tool to the vehicle, and wherein the method further comprises outputting the textual and/or graphical information on the display.

22. A computing system comprising:

one or more processors;

a configurable vehicle service tool;

a vehicle interface;

a display; and a non-transitory computer-readable memory having stored therein program instructions executable by the one or more processors, wherein execution of the program instructions causes the computing system to perform functions comprising:

receiving, at the vehicle interface, one or more vehicle data messages from a vehicle via a wired communication link connecting the vehicle interface of the computing system to a data link connector within the vehicle, wherein:

the one or more vehicle data messages include data indicating an operating condition of the vehicle, and the vehicle interface includes a transceiver configured to transmit requests for vehicle data messages onto the wired communication link and to receive vehicle data messages transmitted onto the wired communication link by the vehicle;

determining, based at least in part on the data indicating the operating condition of the vehicle, a first service scenario stored in the non-transitory computer-readable memory, wherein:

the first service scenario includes first setup instructions, the first setup instructions include a computer-executable instruction to modify configuration settings corresponding to a measurement capability of the configurable vehicle service tool without any user input and a computer-executable instruction to perform an electrical measurement via the configurable vehicle service tool;

modifying the configuration settings corresponding to the measurement capability of the configurable vehicle service tool without any user input via execution of the first setup instructions;

performing the electrical measurement via the configurable vehicle service tool after modifying the configuration settings corresponding to the measurement capability of the configurable vehicle service tool without any user input, wherein the electrical measurement includes a voltage measurement, a current measurement, or a resistance measurement;

generating service data indicative of the electrical measurement; and outputting the service data on the display.

23. The computing system of claim 22, wherein the configurable vehicle service tool includes an oscilloscope, a multimeter, or a digital-volt-ohm meter.

24. A non-transitory computer-readable memory having stored therein program instructions executable by one or more processors of a computing system, wherein execution of the program instructions causes the computing system to perform functions comprising:

receiving, at a vehicle interface of the computing system, one or more vehicle data messages from a vehicle via a wired communication link connecting the vehicle interface of the computing system to a data link connector within the vehicle, wherein:

the one or more vehicle data messages include data indicating an operating condition of the vehicle, the computing system includes a configurable vehicle service tool and a display, and the vehicle interface includes a transceiver configured to transmit requests for vehicle data messages onto the wired communication link and to receive vehicle data messages transmitted onto the wired communication link by the vehicle;

determining, based at least in part on the data indicating the operating condition of the vehicle, a first service scenario stored in the non-transitory computer-readable memory, wherein:

the first service scenario includes first setup instructions, and the first setup instructions include a computer-executable instruction to modify configuration settings corresponding to a measurement capability of the configurable vehicle service tool without any user input and a computer-executable instruction to perform an electrical measurement via the configurable vehicle service tool;

modifying the configuration settings corresponding to the measurement capability of the configurable vehicle service tool without any user input via execution of the first setup instructions;

performing the electrical measurement via the configurable vehicle service tool after modifying the configuration settings corresponding to the measurement capability of the configurable vehicle service tool without any user input, wherein the electrical measurement includes a voltage measurement, a current measurement, or a resistance measurement;

generating service data indicative of the electrical measurement; and outputting the service data on the display.

25. The method of claim 1, wherein:

the configurable vehicle service tool includes a multimeter, and modifying the configuration settings corresponding to the measurement capability of the configurable vehicle service tool without any user input via execution of the first setup instructions includes changing a measurement range of the multimeter from a first measurement range to a second measurement range different than the first measurement range.

26. The computing system of claim 22, wherein:

the configurable vehicle service tool includes a multimeter, and modifying the configuration settings corresponding to the measurement capability of the configurable vehicle service tool without any user input via execution of the first setup instructions includes changing a measurement range of the multimeter from a first measurement range to a second measurement range different than the first measurement range.

* * * * *